United States Patent
Takano

(10) Patent No.: US 9,614,596 B2
(45) Date of Patent: Apr. 4, 2017

(54) COMMUNICATION CONTROL DEVICE, COMMUNICATION CONTROL METHOD, AND TERMINAL DEVICE

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/433,937

(22) PCT Filed: Sep. 26, 2013

(86) PCT No.: PCT/JP2013/076095
§ 371 (c)(1),
(2) Date: Apr. 7, 2015

(87) PCT Pub. No.: WO2014/083927
PCT Pub. Date: Jun. 5, 2014

(65) Prior Publication Data
US 2015/0263797 A1    Sep. 17, 2015

(30) Foreign Application Priority Data

Nov. 28, 2012    (JP) .................................. 2012-259690

(51) Int. Cl.
*H04B 7/04*    (2006.01)
*H04B 7/0452*    (2017.01)
(Continued)

(52) U.S. Cl.
CPC ........... *H04B 7/0452* (2013.01); *H04B 7/043* (2013.01); *H04B 7/0413* (2013.01);
(Continued)

(58) Field of Classification Search
CPC ... H04W 72/046; H04W 16/28; H04W 16/32; H04W 72/042; H04W 16/24;
(Continued)

(56) References Cited

U.S. PATENT DOCUMENTS

| 6,950,678 B1 | 9/2005 | Mujtaba et al. |
| 2005/0113117 A1 * | 5/2005 | Bolin ................... H04W 64/00 455/456.6 |

(Continued)

FOREIGN PATENT DOCUMENTS

| CN | WO 2011150763 A1 * | 12/2011 | ........... H04W 16/28 |
| JP | 2002-26806 A | 1/2002 | |

(Continued)

OTHER PUBLICATIONS

International Search Report issued Dec. 10, 2013 in PCT/JP2013/076095.
Supplementary European Search Report issued Jun. 9, 2016 in European Patent Application No. 13859160.7.

*Primary Examiner* — Vineeta Panwalkar
(74) *Attorney, Agent, or Firm* — Oblon, McClelland, Maier & Neustadt, L.L.P.

(57) ABSTRACT

There is provided a communication control device including a control unit configured to regard each of a plurality of communication regions corresponding to individual beams formed by a directional antenna capable of forming the beams in 3-dimensional directions as a virtual cell and perform communication control when the plurality of beams are formed in the different 3-dimensional directions by the directional antenna.

19 Claims, 28 Drawing Sheets

(51) Int. Cl.
*H04B 7/0413* (2017.01)
*H04B 7/06* (2006.01)
*H04W 52/04* (2009.01)
*H04W 52/42* (2009.01)
*H04W 16/28* (2009.01)
*H04W 88/12* (2009.01)
*H04L 5/00* (2006.01)
*H04W 16/32* (2009.01)
*H04W 36/00* (2009.01)
*H04W 36/04* (2009.01)
*H04W 72/04* (2009.01)

(52) U.S. Cl.
CPC .......... *H04B 7/0617* (2013.01); *H04W 16/28* (2013.01); *H04W 52/04* (2013.01); *H04W 52/42* (2013.01); *H04W 72/046* (2013.01); *H04L 5/0023* (2013.01); *H04W 16/32* (2013.01); *H04W 36/0083* (2013.01); *H04W 36/04* (2013.01); *H04W 72/042* (2013.01); *H04W 88/12* (2013.01)

(58) Field of Classification Search
CPC . H04W 24/02; H04W 72/0453; H04W 52/42; H04W 52/04; H04W 36/0083; H04W 36/04; H04W 88/12; H04B 7/0617; H04B 7/0452; H04B 7/043; H04B 7/0413; H01Q 1/243; H01Q 1/245; H01Q 1/246; H01Q 3/00; H01Q 3/24; H01Q 3/26; H04L 5/0023
See application file for complete search history.

(56) References Cited

U.S. PATENT DOCUMENTS

| | | |
|---|---|---|
| 2007/0195736 A1 | 8/2007 | Taira et al. |
| 2009/0047955 A1* | 2/2009 | Frenger ................ H04J 11/0093 455/436 |
| 2010/0165914 A1 | 7/2010 | Cho et al. |
| 2011/0170492 A1 | 7/2011 | Taira et al. |
| 2012/0076039 A1 | 3/2012 | Kwon et al. |
| 2012/0134284 A1* | 5/2012 | Dahlman .............. H04W 16/28 370/252 |
| 2013/0034050 A1* | 2/2013 | Ros ........................ H04B 7/185 370/316 |
| 2013/0089059 A1 | 4/2013 | Takano |
| 2013/0109400 A1* | 5/2013 | Liu ....................... H04W 16/28 455/452.1 |
| 2013/0157660 A1* | 6/2013 | Awad ................... H04W 72/046 455/435.1 |
| 2013/0210431 A1 | 8/2013 | Abe et al. |
| 2013/0336270 A1* | 12/2013 | Nagata ................. H04W 16/28 370/329 |
| 2013/0344877 A1* | 12/2013 | Ma ........................ H04W 16/04 455/446 |

FOREIGN PATENT DOCUMENTS

| | | | |
|---|---|---|---|
| JP | 2007-228211 A | 9/2007 | |
| JP | 2010-503365 A | 1/2010 | |
| JP | 2012-39168 A | 2/2012 | |
| JP | 2012-49680 A | 3/2012 | |
| JP | WO 2012093687 A1 * | 7/2012 | ........... H04W 16/28 |
| JP | 2012-169738 A | 9/2012 | |
| JP | 2012-169774 A | 9/2012 | |
| WO | WO 2009/041759 A1 | 4/2009 | |

* cited by examiner

● ANTENNA ELEMENT

FIG. 9
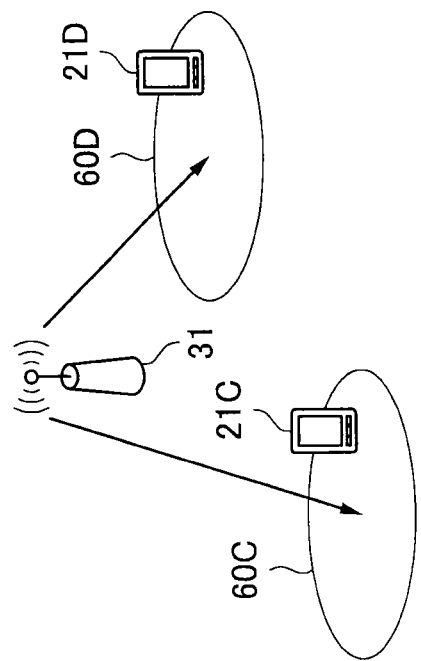
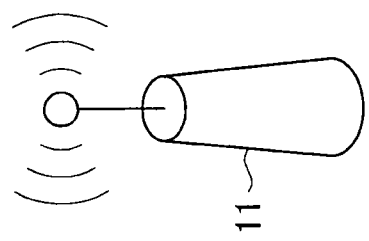

FIG. 10
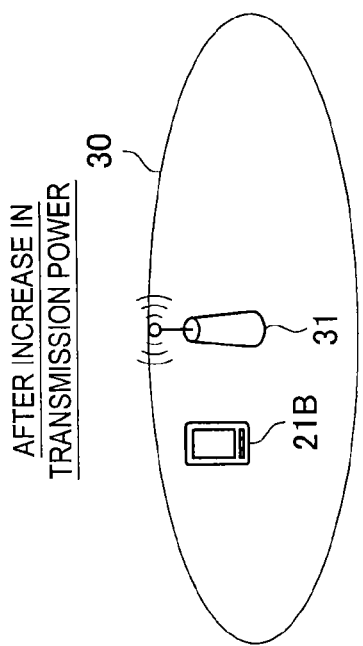
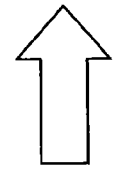
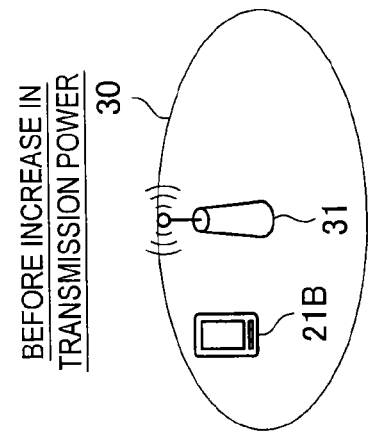

FIG. 11
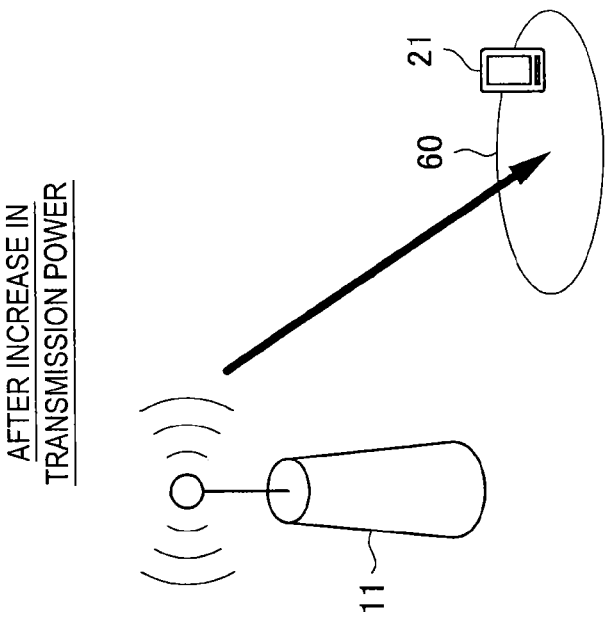
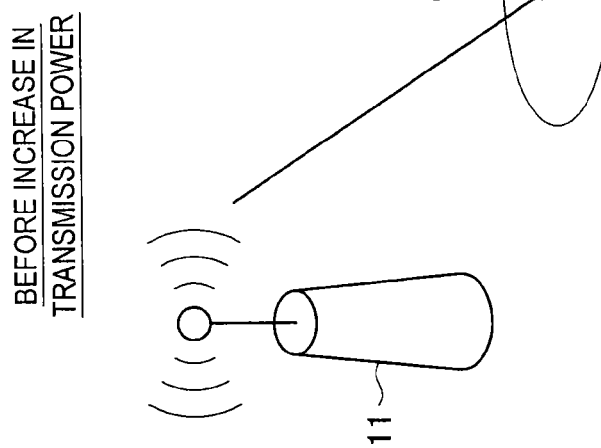

FIG. 16
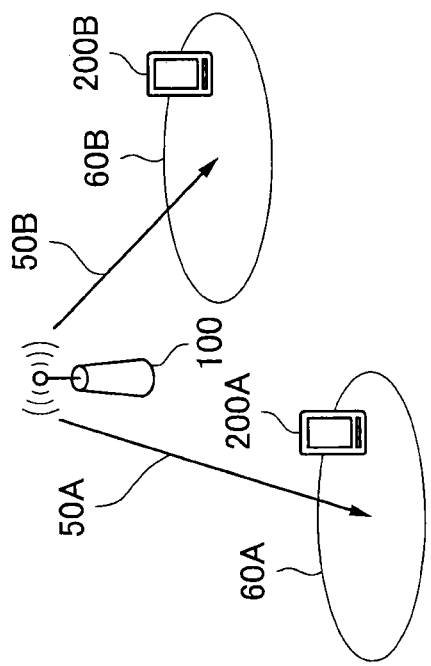
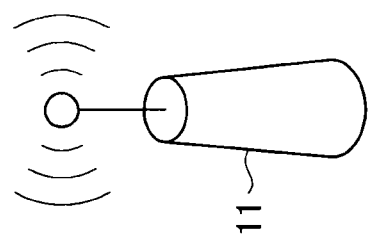

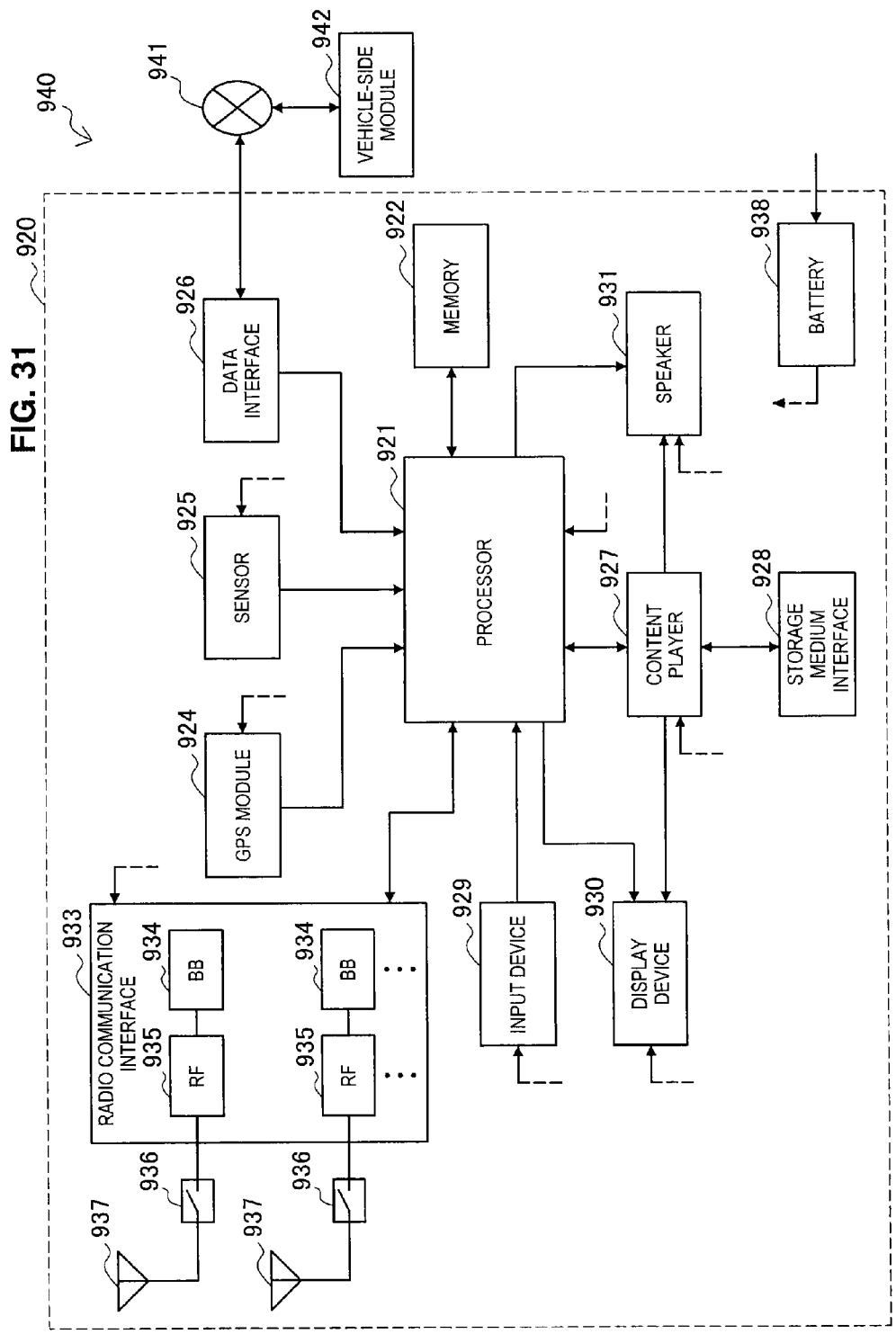

COMMUNICATION CONTROL DEVICE, COMMUNICATION CONTROL METHOD, AND TERMINAL DEVICE

TECHNICAL FIELD

The present disclosure relates to a communication control device, a communication control method, and a terminal device.

BACKGROUND ART

In standardization of 4th generation (4G) cellular communication technologies typified by Long Term Evolution-Advanced (LTE-A), Multiple User-Multiple Input Multiple Output (MU-MIMO) developed from Single User-Multiple Input Multiple Output (SU-MIMO) has been noticed. MU-MIMO is a technology for multiplexing communication of a plurality of users spatially and performing the communication simultaneously with the same band, and is expected to considerably improve communication throughputs.

For example, Patent Literature 1 discloses a technology for enabling pairing for MU-MIMO to be decided flexibly by allowing a terminal device to select preferable transmission weighting from transmission weighting candidates and feed the preferable transmission weighting back to a base station.

CITATION LIST

Patent Literature

SUMMARY OF INVENTION

Technical Problem

In MU-MIMO, however, signals are transmitted with a plurality of beams in different directions, but a control signal (for example, a signal transmitted with a physical downlink control channel including resource assignment information) to be transmitted is common to the plurality of beams. That is, even when the plurality of beams are formed, the number of control signals may not be increased. For this reason, in MU-MIMO, there is a possibility of a cell-splitting gain not being sufficiently obtained due to lack of the control signal.

It is desirable to provide a structure capable of further increasing the number of transmittable control signals.

Solution to Problem

According to the present disclosure, there is provided a communication control device including a control unit configured to regard each of a plurality of communication regions corresponding to individual beams formed by a directional antenna capable of forming the beams in 3-dimensional directions as a virtual cell and perform communication control when the plurality of beams are formed in the different 3-dimensional directions by the directional antenna.

According to the present disclosure, there is provided a communication control method including regarding each of a plurality of communication regions corresponding to individual beams formed by a directional antenna capable of forming the beams in 3-dimensional directions as a virtual cell and performing communication control when the plurality of beams are formed in the different 3-dimensional directions by the directional antenna.

According to the present disclosure, there is provided a terminal device including a radio communication unit configured to perform radio communication with a base station that regards each of a plurality of communication regions corresponding to individual beams formed by a directional antenna capable of forming the beams in 3-dimensional directions as a virtual cell and performs communication control when the plurality of beams are formed in the different 3-dimensional directions by the directional antenna, and a control unit configured to regard each of the plurality of communication regions as the virtual cell and perform a communication process.

Advantageous Effects of Invention

According to an embodiment of the present disclosure described above, it is possible to further increase the number of transmittable control signals.

BRIEF DESCRIPTION OF DRAWINGS

FIG. 9 is an explanatory diagram illustrating an example of a pico cell which is a virtual cell formed by a pico eNodeB.

FIG. 10 is an explanatory diagram illustrating an example of a relation between transmission power of a pico eNodeB and a radius of a pico cell.

FIG. 11 is an explanatory diagram illustrating an example of a relation between transmission power of an eNodeB and a radius of a virtual cell.

FIG. 16 is an explanatory diagram illustrating an example of a case in which a virtual cell is formed by a pico eNodeB.

FIG. 31 is a block diagram illustrating an example of a schematic configuration of a car navigation device to which technology according to the present disclosure may be applied.

DESCRIPTION OF EMBODIMENTS

Figure 1:
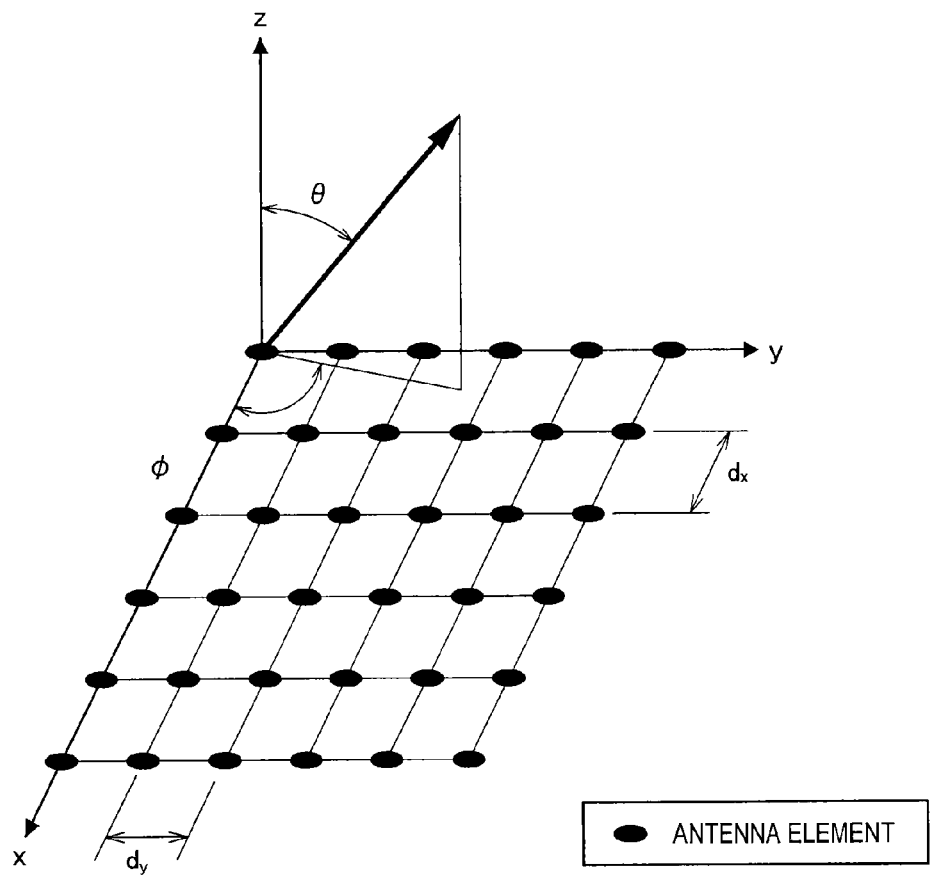
FIG. 1 is an explanatory diagram illustrating a relation between the position of each antenna element and a 3-dimensional direction of a beam.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Introduction
1.1. Radio communication technology in 3GPP
1.2. Technical problem
2. Overview of embodiment
2.1. Solution to technical problem
2.2. Virtual cell
3. Schematic configuration of radio communication system
4. Configuration of eNodeB
5. Configuration of UE
6. Flow of process
7. First modification example
7.1. Overview
7.2. Configuration of eNodeB
7.3. Flow of process
8. Second modification example
8.1. Overview
8.2. Configuration of eNodeB
8.3. Configuration of UE
8.4. Flow of process
9. Third modification example
9.1. Overview
9.2. Configuration of eNodeB
9.3. Flow of process
10. Application examples
10.1. Application example of eNodeB
10.2. Application example of UE
11. Conclusion

1. INTRODUCTION

First, a radio communication technology and a technical problem in the 3rd Generation Partnership Project (3GPP) will be described.

1.1. Radio Communication Technology in 3GPP

The radio communication technology in 3GPP will be first described with reference to FIGS. 1 to 3.
(Background and Necessity of Massive MIMO)

At present, investigation of an improvement in a communication capacity is in progress to deal with explosively increasing traffic in 3GPP. It is being said that a communication capacity of about 1000 times the current communication capacity will be necessary in the future. In a technology such as MU-MIMO or Coordinated Multipoint transmission/reception (CoMP) currently being investigated, there is a possibility that not even a communication capacity of several times will be able to be obtained. For this reason, a breakthrough scheme of increasing the communication capacity is necessary.

In Release 10 of 3GPP, mounting eight antennas on an eNodeB has been standardized. Accordingly, according to the antennas, MIMO of eight layers can be realized in the case of SU-MIMO. MIMO of the eight layers is a technology for spatially multiplexing eight independent streams. MU-MIMO of two layers can also be realized for four users.

Since a user equipment (UE) has a small space for arranging antennas and the processing capability of the UE is restrictive, it is difficult to increase the number of antennas of the UE. However, with recent advances in antenna mounting technologies, it is not difficult to arrange about one hundred antennas in an eNodeB.

When a base station includes about 100 antennas in this way, a half-value width (an angle associated with an antenna gain of −3 dB) of a beam formed by an antenna is expected to be narrowed. That is, a sharp beam is expected to be able to be formed. By arranging antenna elements on a plane, it is possible to form beams in desired 3-dimensional directions. It has been proposed that signals be transmitted toward a specific building present at a position higher than a base station using the beams of the 3-dimensional directions.

Since the number of antennas increases, the number of users in MU-MIMO can be increased. When the number of antennas of the UE is two, the number of spatially independent streams in regard to one UE is two. Therefore, increasing the number of users of MU-MIMO is more reasonable than increasing the number of streams in regard to one UE.
(3D Beamforming)

In 2-dimensional beamforming, the direction of a beam can be changed in a horizontal direction. In 3-dimensional beamforming, on the other hand, the direction of a beam can be changed not only in the horizontal direction but also in a vertical direction. Hereinafter, this point will be described with reference to FIG. 1.

(Scheme of Calculating Weighting Coefficient of 3D Beamforming)

A weighting coefficient of each antenna element for beamforming is expressed as a complex number. This point will be described specifically with reference to FIG. 1.

FIG. 1 is an explanatory diagram illustrating a relation between the position of each antenna element and a 3-dimensional direction of the beam. The antenna elements arranged in a lattice shape are illustrated in FIG. 1. Two intersecting axes x and y on a plane on which the antenna elements are arranged and one axis z passing through the plane are shown. Here, the direction of a beam to be formed is expressed by, for example, an angle phi (Greek letter) and an angle theta (Greek letter). The angle phi (Greek letter) is an angle formed by the components of the xy plane and the x axis in the direction of the beam. The angle theta (Greek letter) is an angle formed by the direction of the beam and the z axis. In this case, for example, a weighting coefficient $V_{m,n}$ of the antenna element disposed at an m-th position in the x axis direction and disposed at an n-th position in the y axis direction can be expressed as follows.

$$V_{m,n}(\theta,\phi,f)=\exp(j2\pi f/c\{(m-1)d_x \sin(\theta)\cos(\phi)+(n-1)d_y \sin(\theta)\sin(\phi)\})$$ [Math 1]

Here, f is a frequency and c is the speed of light. Further, j is an imaginary unit in the complex number. Further, $d_x$ is an interval between the antenna elements in the x axis direction and $d_y$ is an interval between the antenna elements in the y axis direction. The coordinates of the antenna elements are expressed as follows.

$$x=(m-1)d_x, y=(n-1)d_y$$ [Math 2]

When a desired 3-dimensional direction is decided, the weighting coefficient of each antenna element can be obtained based on the direction and the frequency f according to the above-described expressions. Such a weighting coefficient is used, for example, as illustrated in FIG. 2.

Figure 2:
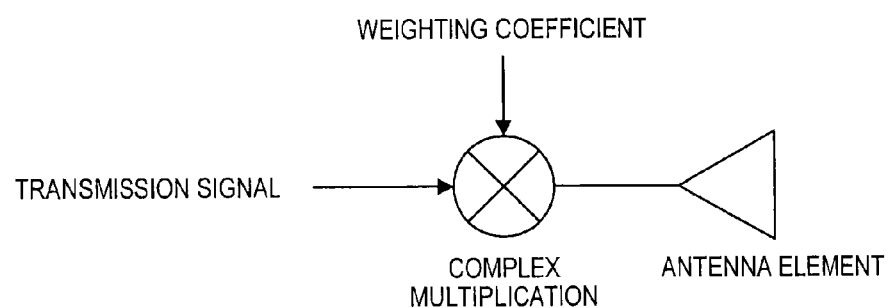
FIG. 2 is an explanatory diagram illustrating an example of a scheme for using a weighting coefficient for beamforming.

FIG. 2 is an explanatory diagram illustrating an example of a scheme for using a weighting coefficient for beamforming. Referring to FIG. 2, a transmission signal corresponding to each antenna element is multiplied by the weighting coefficient of each antenna element through complex multiplication. The transmission signal multiplied by the weighting coefficient through the complex multiplication is transmitted from the antenna element. For example, the complex multiplication by the weighting coefficient is performed on an analog signal. The complex multiplication by the weighting coefficient may be performed on a digital signal.

An example of the scheme of calculating the weighting coefficient has been described, but the scheme of calculating the weighting coefficient is not limited thereto. Various calculation schemes can be applied.

(Pico Cell of Release 10)

In Release 10 and Release 11 of 3GPP, a small cell is mentioned. In Release 10 and Release 11, the small cell is specifically referred to as a pico cell and an eNodeB forming the pico cell is referred to as a pico eNodeB. A cell formed by the eNodeB with a normal size is referred to as a macro cell with respect to the small cell. The eNodeB forming the macro cell is referred to as a macro eNodeB.

In Release 10, a remote radio head (RRH) is mentioned as a form of the pico eNodeB. The RRH mainly includes, for example, an analog signal processing portion and an antenna portion and is extended with an optical fiber from the macro eNodeB. In this case, a communication control function for the pico cell can be mounted on the side of the macro eNodeB.

There is a form in which the macro eNodeB and the pico eNodeB use the same frequency band and the macro cell and the small cell overlap. Such a disposition form of the cells or the base stations is referred to as a heterogeneous network (Het-Net). Hereinafter, this point will be described specifically with reference to FIG. 3.

Figure 3:
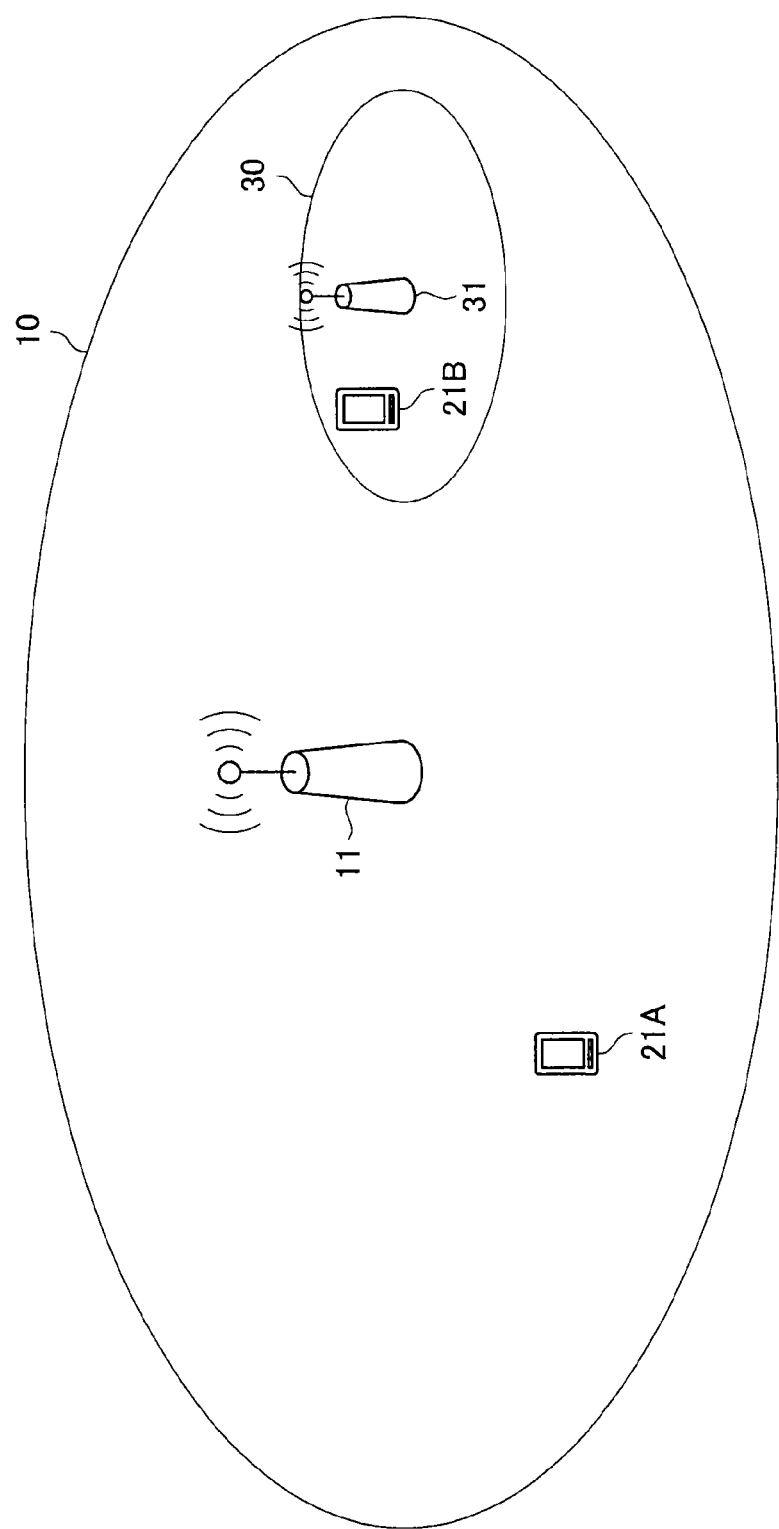
FIG. 3 is an explanatory diagram illustrating an example of a Het-Net.

FIG. 3 is an explanatory diagram illustrating an example of a Het-Net. A macro cell 10 and a macro eNodeB 11 are illustrated in FIG. 3. A pico cell 30 overlapped by the macro cell 10 and a pico eNodeB 31 are also illustrated. The macro eNodeB 11 and the pico eNodeB 31 communicate with the UE 21 using the same frequency band.

Reducing interference between the macro eNodeB and the pico eNodeB has been recognized as an issue in a Het-Net. A technology for realizing the reduction in the interference has been discussed actively in 3GPP. For example, a scheme of providing a subframe to almost stop transmission by the macro eNodeB 11 has been investigated. Such a subframe is referred to as an Almost Blank Subframe (ABS). The pico eNodeB can reduce interference at a cell edge of a pico cell, which is particularly problematic among the interference between the macro eNodeB and the pico eNodeB, by assigning resources of an ABS to a UE located at the cell edge of the pico cell.

1.2. Technical Problem

The above-described MU-MIMO is a technology for multiplexing communication of a plurality of users spatially and allowing the same band to be simultaneously used and considerably improves communication throughputs.

In MU-MIMO, however, signals are transmitted with a plurality of beams in different directions, but a control signal (for example, a signal transmitted with a physical downlink control channel including resource assignment information) to be transmitted is common to the plurality of beams. That is, even when the plurality of beams are formed, the number of control signals may not be increased. For this reason, in MU-MIMO, there is a possibility of a cell-splitting gain not being sufficiently obtained due to lack of the control signal.

Accordingly, in an embodiment, the number of transmittable control signals is configured to be able to be further increased.

2. OVERVIEW OF EMBODIMENT

Next, an overview of an embodiment will be described.

2.1. Solution to Technical Problem

In the embodiment, a plurality of beams are formed in different 3-dimensional directions by a directional antenna capable of forming the beams in the 3-dimensional directions. Then, communication control is performed such that each of a plurality of communication regions corresponding to individual beams formed by the directional antenna is regarded as an imaginary cell (hereinafter referred to as a virtual cell). Hereinafter, a specific example of this point will be described with reference to FIG. 4.

Figure 4:
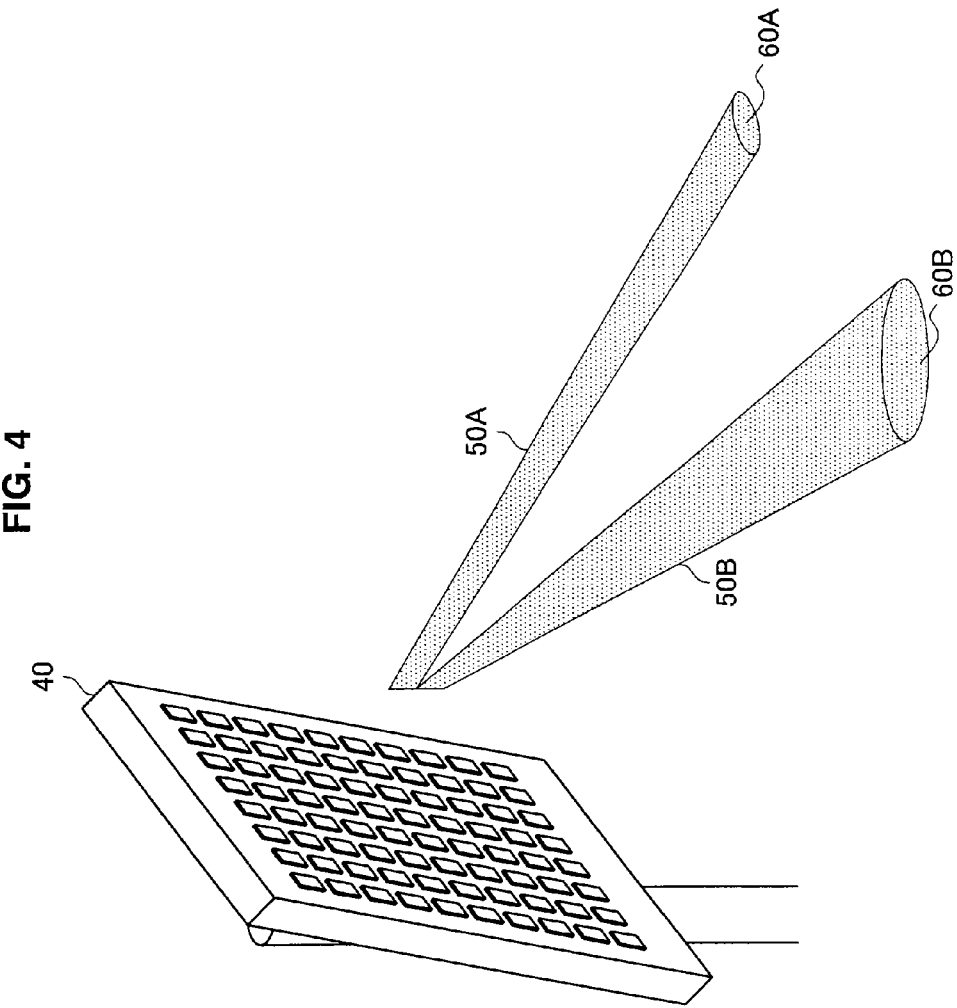
FIG. 4 is an explanatory diagram illustrating an example of a virtual cell according to an embodiment.

FIG. 4 is an explanatory diagram illustrating an example of the virtual cell according to the embodiment. A directional antenna 40 is illustrated in FIG. 4. The directional antenna 40 is able to form a beam in 3-dimensional directions. For example, as illustrated in FIG. 4, the directional antenna 40 forms a plurality of beams 50 in different 3-dimensional directions. For example, the directional antenna 40 is disposed at a high position and the beams 50 are radiated downward. Then, a communication region 60 corresponding to each beam 50 is generated. A UE can receive a signal delivered with a beam 50A in a communication region 60A and receive a signal delivered with a beam 50B in a communication region 60B.

In particular, in the embodiment, the communication control is performed such that each of the communication region 60A corresponding to the beam 50A and the communication region 60B corresponding to the beam 50B is regarded as a virtual cell. That is, an eNodeB performs the communication control such that the communication region 60A (that is, the virtual cell 60A) is one cell. Further, an eNodeB perform the communication control such that the communication region 60B (that is, the virtual cell 60B) is one cell.

The fact that a plurality of beams are formed in different directions by a directional antenna does not particularly differ between the scheme according to the embodiment and MU-MIMO. In MU-MIMO, a communication region corresponding to each beam is merely a partial region of one large cell formed by an eNodeB. In the scheme according to the embodiment, however, the communication region is one cell (one imaginary cell) formed by an eNodeB. In this way, the scheme according to the embodiment is different from MU-MIMO.

2.2. Characteristics of Virtual Cell

Next, several characteristics of the virtual cell according to the embodiment will be described.
(Differences Between MU-MIMO and Scheme Related to Virtual Cell)

Differences between MU-MIMO and the scheme related to the virtual cell (that is, the scheme according to the embodiment) will be described more specifically.
—Control Information In MU-MIMO, a control signal (for example a control signal transmitted with a physical downlink control channel (PDCCH) including resource assignment information) to be transmitted is common between the plurality of beams. In the scheme related to the virtual cell, on the other hand, a control signal (a control signal transmitted with the PDCCH) to be transmitted is different between the plurality of beams. That is, a control signal (for example, a control signal transmitted with the PDCCH) of each individual virtual cell 60 is generated and the control signal is transmitted to the corresponding individual virtual cell 60. Hereinafter, a specific example of this point will be described with reference to FIG. 5.

Figure 5:
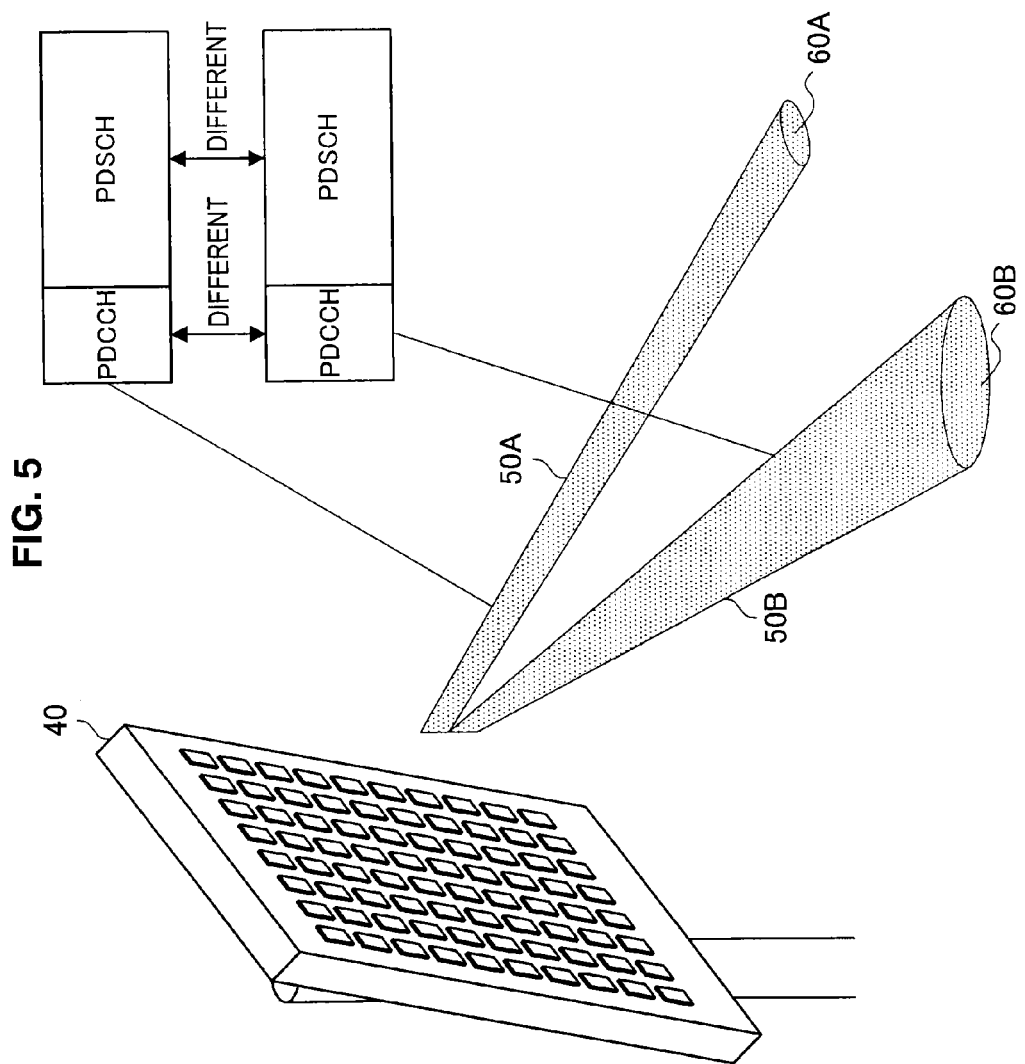
FIG. 5 is an explanatory diagram illustrating an example of a control signal of the virtual cell according to the embodiment.

FIG. 5 is an explanatory diagram illustrating an example of a control signal of the virtual cell according to the embodiment. As in FIG. 4, the directional antenna 40, the beams 50, and the communication regions 60 (that is, the virtual cells 60) are illustrated in FIG. 5. Further, a PDCCH and a physical downlink shared channel (PDSCH) are illustrated as signals transmitted with the respective beams. As illustrated in FIG. 5, in the scheme related to the virtual cell, the control signal transmitted with the PDCCH of the beam 50A and the control signal transmitted with the PDCCH of the beam 50B are different. This is because the communication regions 60A and 60B are regarded as different cells, and thus the different control signals are generated. In MU-MIMO, a signal transmitted with the PDCCH of the beam 50A and a signal transmitted with the PDCCH of the beam 50B are the same. In the scheme related to the virtual cell, for example, of control signals transmitted with other physical control channels and signals transmitted with the PDSCH, control signals are also different between the beam 50A and the beam 50B. Of course, user data signals among signals transmitted with the PDSCH are different between the beam 50A and the beam 50B.

As a result, in MU-MIMO, the number of transmittable control signals does not increase. In the scheme related to the virtual cell, however, the number of transmittable control signals increases.

The control signal of each of the individual virtual cells 60 is not limited to the PDCCH. The control signal includes, for example, a control signal used to transmit identification information (that is, a cell ID) of a cell, that is, a synchronization signal transmitted with a synchronization channel. The control signal includes, for example, a common reference signal (CRS). The control information includes, for example, a control signal (for example, a control signal of a PBCH or a control signal used to transmit system information in the PDSCH) corresponding to system information.
—Reduction in Burden of Pairing In MU-MIMO, it is necessary to decide a combination of users (that is, UEs) which are simultaneously spatially multiplexed. That is, it is necessary to perform pairing of the users. This is because it is easy to perform MU-MIMO in regard to a user located in a different direction in a view from the eNodeB, but it is difficult to perform MU-MIMO in regard to a user located in the same direction in a view from the eNodeB. For this reason, proper pairing is necessary.

When the number of antennas is several and the number of users of MU-MIMO increases, as in the above-described massive MIMO, the number of combinations of the antennas and the users increases exponentially. For this reason, processes necessary for the pairing of the user sharply increase.

On the other hand, in the scheme related to the virtual cell, the pairing may not be performed. This is because a process such as pairing is not necessary in the scheme related to the virtual cell since communication of the users (that is, the UEs) located in different cells is merely spatially multiplexed (that is, the UEs located in the different cells simultaneously use the same frequency). Therefore, the burden of the pairing is reduced compared to MU-MIMO.
—Viewpoint of Transmission Power The maximum transmission power of the eNodeB is decided according to a mandatory standard. In MU-MIMO, power transmitted from one eNodeB is shared between the plurality of users. Therefore, when the number of beams increases, the transmission power per beam decreases.

On the other hand, there is a possibility of a virtual cell being recognized as one cell in the future, although this depends on legislation. In this case, the maximum transmission power can be assigned to a beam corresponding to a virtual cell.
(Differences Between Normal Pico Cell and Pico Cell which is Virtual Cell)

Differences between a normal pico cell formed by a normal pico eNodeB and a pico cell which is a virtual cell will be described.
—Reception Power in Cell Edge In the normal pico cell formed by the normal pico eNodeB, reception power of a transmission signal of the pico eNodeB attenuates gradually from the center of the pico cell to the cell edge of the pico cell. A specific example of this point will be described with reference to FIG. 6.

Figure 6:
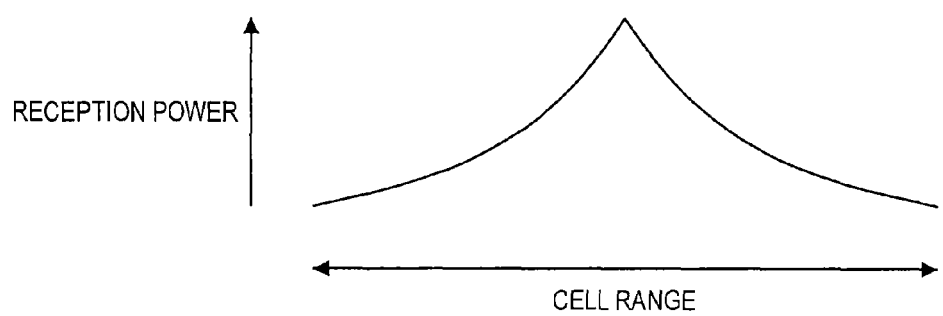
FIG. 6 is an explanatory diagram illustrating an example of a change in reception power in a normal pico cell formed by a normal pico eNodeB.

FIG. 6 is an explanatory diagram illustrating an example of a change in the reception power in the normal pico cell formed by the normal pico eNodeB. The change in the reception power in a cell range is illustrated in FIG. 6. As illustrated in FIG. 6, in the normal pico cell formed by the normal pico eNodeB, the reception power attenuates gradually from the center (that is, the pico eNodeB) of the cell to the cell edge.

In the pico cell which is a virtual cell, on the other hand, the reception power of a transmission signal of the pico eNodeB hardly changes from the center of the pico cell to the cell edge of the pico cell. The reception power sharply changes near the cell edge.

Figure 7:
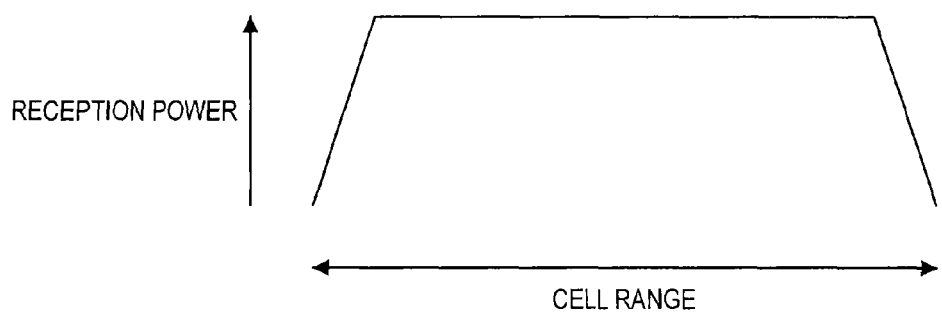
FIG. 7 is an explanatory diagram illustrating an example of a change in the reception power in the pico cell which is a virtual cell.

FIG. 7 is an explanatory diagram illustrating an example of a change in the reception power in the pico cell which is a virtual cell. In FIG. 7, a change in the reception power is illustrated in the cell range. As illustrated in FIG. 7, in the pico cell which is a virtual cell, the reception power hardly changes from the center (that is, the pico eNodeB) of the pico cell to the cell edge. This is because the pico eNodeB is not located at the center of the pico cell, but the eNodeB is located at a position distant from the pico cell, and therefore the reception power in the pico cell is nearly uniform consequently. The reception power sharply changes near the cell edge of the pico cell. The reception power considerably changes between a position at which the beam arrives and a position at which the beam does not arrive. Thus, the cell edge becomes clear in the pico cell formed by the beam. When the UE approaches a virtual cell, the UE observes the reception power just as the cell suddenly appears.

Thus, when the virtual cell is used, interference between cells rarely occurs at the cell edge.

—Disposition of Cell

The normal pico cell formed by the normal pico eNodeB is basically unable to be moved. In order to move the normal pico cell, it is necessary to move the pico eNodeB itself. When the normal pico cell is added, it is necessary to newly install a pico eNodeB.

On the other hand, since the pico cell which is a virtual cell is formed by the beam, the pico cell can be easily moved by changing a weighting coefficient for forming the beam. The pico cell which is a virtual cell can be easily added by forming a new beam. The pico cell which is a virtual cell may also be deleted easily.

Thus, since the pico cell which is a virtual cell can be added, deleted, and changed flexibly, the radio communication system 1 can be disposed and administrated more flexibly.

(Virtual Cell Formed by Pico eNodeB)

A scenario in which the normal pico cell formed by the normal pico eNodeB is substituted with a pico cell which is a virtual cell formed by a macro eNodeB can be considered. A specific example of this point will be described with reference to FIG. 8.

Figure 8:
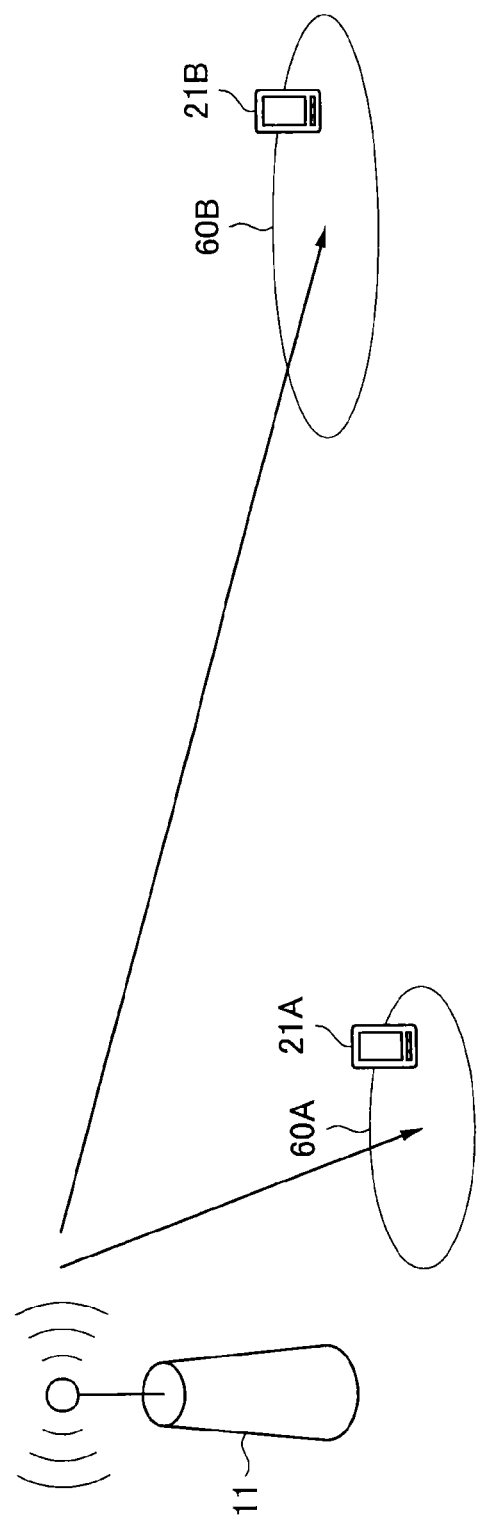
FIG. 8 is an explanatory diagram illustrating an example of a pico cell which is a virtual cell formed by a macro eNodeB.

FIG. 8 is an explanatory diagram illustrating an example of a pico cell which is a virtual cell formed by a macro eNodeB. A macro eNodeB 11 and a virtual cell 60 formed by the macro eNodeB 11 are illustrated in FIG. 8. Such a virtual cell 60 can be used as a pico cell. However, a beam from the macro eNodeB becomes wider according to a distance. Therefore, when the distance between the macro eNodeB and the virtual cell 60 is large, the radius of the virtual cell 60 increases.

Accordingly, a scenario in which the pico cell formed by the normal pico eNodeB is substituted with a pico cell which is a virtual cell formed by a pico eNodeB can be considered. A specific example of this point will be described with reference to FIG. 9.

FIG. 9 is an explanatory diagram illustrating an example of the pico cell which is a virtual cell formed by the pico eNodeB. A macro eNodeB 11, a pico eNodeB 31, and virtual cells 60 formed by the pico eNodeB 31 are illustrated in FIG. 8. Such a virtual cell 60 can be used as a pico cell. Since the distances between the pico eNodeB 31 and the virtual cells 60 are relatively short, it is easy to form the virtual cells 60 with desired radii.

For example, about 10 pico eNodeBs can be formed around the macro eNodeB. However, it is very difficult to actually form, for example, about 300 pico eNodeBs. Accordingly, for example, by forming about 10 pico eNodeBs around the macro eNodeB and forming about 50 virtual cells in the pico eNodeB, about 500 pico cells which are virtual cells can be formed around the macro eNodeB.

(Relation Between Virtual Cell and Pico Cell in Release 10)

According to Release 10, the transmission power of the pico eNodeB is less than the transmission power of the macro eNodeB. Accordingly, a region for which the reception power of the transmission signal of the pico eNodeB is greater than the reception power of the transmission signal of the macro eNodeB is a region near the pico eNodeB. The radius of the region near the pico eNodeB, that is, the radius of the pico cell, is decided according to a ratio of the transmission power of the pico eNodeB to the transmission power of the macro eNodeB. A specific example of this point will be described with reference to FIG. 10.

FIG. 10 is an explanatory diagram illustrating an example of a relation between transmission power of a pico eNodeB and a radius of a pico cell. A pico cell 30 before an increase in the transmission power of a pico eNodeB 31 and the pico cell 30 after the increase in the transmission power of the pico eNodeB 31 are illustrated in FIG. 10. When the transmission power of the macro eNodeB is assumed to be constant and the power of the pico eNodeB 31 increases in this way, the radius of the pico cell 30 increases.

On the other hand, the radius of a virtual cell depends on the width of a beam, but does not depend on the transmission power of the eNodeB. A specific example of this point will be described with reference to FIG. 11.

FIG. 11 is an explanatory diagram illustrating an example of the relation between the transmission power of the eNodeB and the radius of the virtual cell. A virtual cell 60 before an increase in the transmission power of the macro eNodeB 11 and the virtual cell 60 after the increase in the transmission power of the macro eNodeB 11 are illustrated in FIG. 11. Thus, the size of the radius of the virtual cell 60 does not change even when the transmission power increases. This is because the beam corresponding to the virtual cell depends on the weighting coefficient. This example is the example of the eNodeB, but the same also applies to the pico eNodeB.

Even in the virtual cell 60, the UE may not receive a signal in regard to the virtual cell 60 when the reception power of a downlink transmission signal of the virtual cell 60 is not greater than the reception power of a downlink transmission signal of a macro cell. Attention should be paid to this point.

As described above, the power of the virtual cell hardly changes as the virtual cell is distant from the center of the cell. Therefore, the reception power of the downlink transmission signal of the virtual cell is nearly uniform across the entire virtual cell. Accordingly, when the virtual cell is used as a pico cell, the reception power of the downlink transmission signal of the pico cell can also be set to be greater by X dB than the reception power of the downlink transmission signal of the macro cell across the entire pico cell which is the virtual cell.

The fact that the reception power of the signal in regard to the pico cell which is the virtual cell is nearly uniform across the entire pico cell means that it takes less effort to assign (schedule) resources to the UE located in the pico cell. Hereinafter, this point will be described in more detail.

In the case of the pico cell in Release 10, unlike the virtual cell, the UE located near the center of the pico cell is rarely affected by the interference by the transmission signal of the macro eNodeB, but the UE located in the cell edge of the pico cell is strongly affected by the interference by the transmission signal of the macro eNodeB. Accordingly, the pico eNodeB assigns resources of the ABS which is rarely transmitted with a signal by the macro eNodeB to the UE located in the cell edge. Thus, in the pico cell of Release 10, scheduling related to the ABS is necessary.

On the other hand, for the pico cell of the virtual cell, the reception power is nearly uniform across the entire pico cell. Therefore, the ABS itself is not necessary and the scheduling related to the ABS is not necessary either. Therefore, the burden of the scheduling by the pico eNodeB is reduced.

When the ABS is used, the throughput of the macro cell generally deteriorates. However, as described above, when the pico cell which is a virtual cell is used, the ABS itself is not necessary. Accordingly, by using the pico cell which is the virtual cell, it is possible to prevent the throughput of the macro cell from deteriorating.

(Downlink and Uplink of Virtual Cell)

In a time division duplex (TDD) system, the eNodeB can realize beamforming of an uplink using the weighting coefficient of beamforming of a downlink. For example, the eNodeB can realize the beamforming of the uplink by performing complex multiplication of a signal received by each antenna element by the weighting coefficient using the weighting coefficient of the beamforming of the downlink. The complex multiplication by the weighting coefficient may be performed when the received signal is an analog signal or may be performed after the received signal is converted into a digital signal. Thus, in the TDD system, it is possible to match the cell of the uplink with the cell of the downlink.

On the other hand, in a frequency division duplexing (FDD) system, the weighting coefficient of the beamforming of the downlink may not be used for the weighting coefficient of the beamforming of the uplink. Therefore, in the FDD system, a scheme of performing communication in the virtual cell in regard to the downlink and performing communication in a normal cell in regard to the uplink can be adopted.

Thus, the virtual cell can be said to be suitable for the TDD system.

3. SCHEMATIC CONFIGURATION OF RADIO COMMUNICATION SYSTEM

Figure 12:
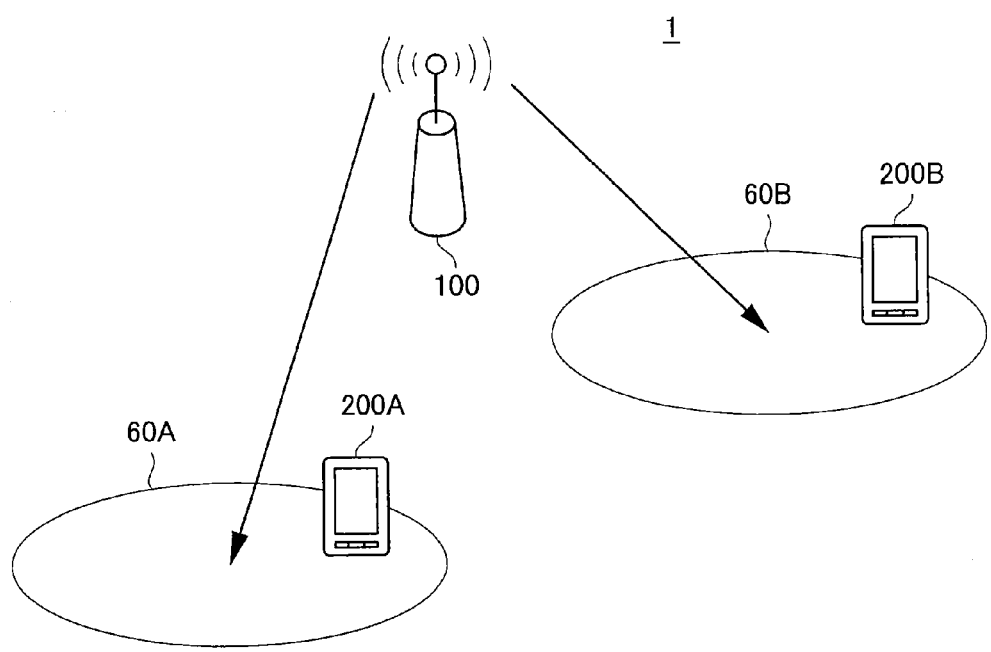
FIG. 12 is an explanatory diagram illustrating an example of a schematic configuration of a radio communication system according to an embodiment.

Next, a schematic configuration of the wireless communication system according to an embodiment of the present disclosure will be described with reference to FIG. 12. FIG. 12 is an explanatory diagram illustrating an example of the schematic configuration of the radio communication system 1 according to an embodiment. Referring to FIG. 1, the radio communication system 1 according to the embodiment includes an eNodeB 100 and at least one UE 200.

The eNodeB 100 includes a directional antenna capable of forming a beam in a 3-dimensional direction and a beam is formed by the directional antenna. The eNodeB 100 regards a communication region 60 corresponding to each beam as an imaginary cell (that is, a virtual cell) and performs communication controls. That is, the eNodeB 100 treats each communication region 60 as a cell.

The eNodeB 100 performs radio communication with the UE 200 located in each virtual cell 60. For example, the eNodeB 100 transmits a signal to the UE 200A located in a virtual cell 60A with the beam corresponding to the virtual cell 60A. The eNodeB 100 transmits a signal to the UE 200B located in the virtual cell 60B with the beam corresponding to the virtual cell 60B.

The UE 200 performs radio communication with the eNodeB 100. For example, the UE 200 receives the signal of the beam in the communication region 60 corresponding to the beam formed by the eNodeB 100. For example, when the UE 200 is located in the communication region 60A, the UE 200 receives the signal with the beam corresponding to the communication region 60A. When the UE 200 is located in the communication region 60B, the UE 200 receives the signal with the beam corresponding to the communication region 60B.

The UE 200 regards each of the communication regions 60 as an imaginary cell (that is, a virtual cell) and performs a communication process. That is, the UE 200 treats each communication region 60 as a cell.

The eNodeB 100 may also form a normal cell with a nondirectional beam in addition to the virtual cells 60. In this case, the normal cell may overlap some or all of the virtual cells 60 or may overlap none of the virtual cells. In this case, even when the UE 200 is located in the normal cell, the UE 200 may perform the radio communication with the eNodeB 100.

When the radio communication system 1 includes a macro eNodeB and a pico eNodeB, the eNodeB 100 may serve as the macro eNodeB or serve as the pico eNodeB.

4. CONFIGURATION OF eNODEB

Figure 13:
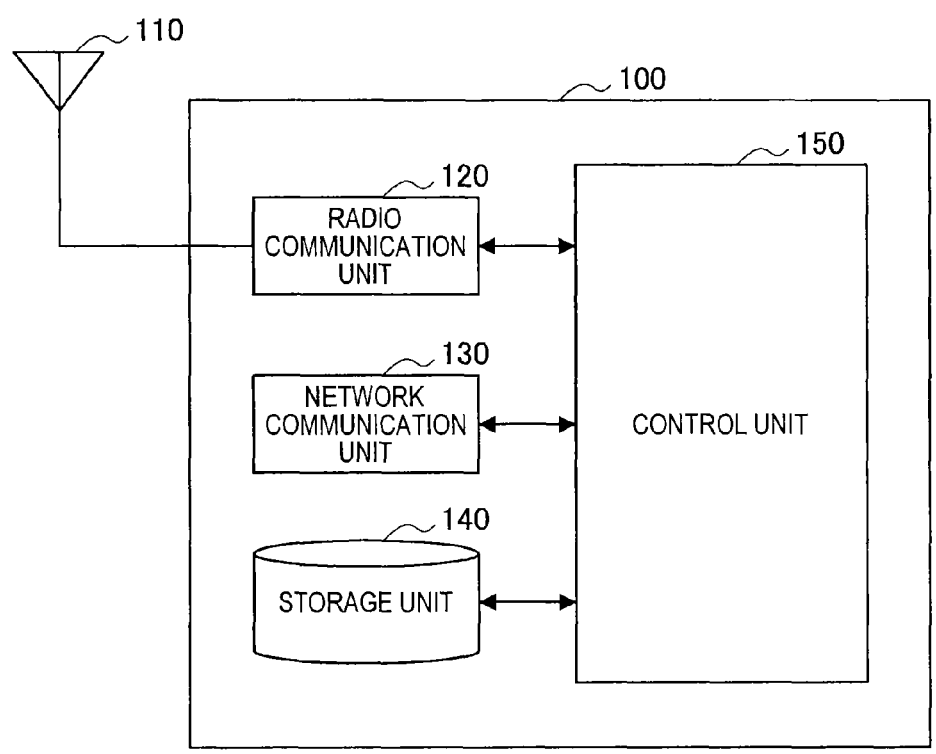
FIG. 13 is a block diagram illustrating an example of the configuration of an eNodeB according to the embodiment.

An example of the configuration of the eNodeB 100 according to the embodiment will be described with reference to FIG. 13. FIG. 13 is a block diagram illustrating an example of the configuration of the eNodeB 100 according to the embodiment. Referring to FIG. 13, the eNodeB 100 includes an antenna unit 110, a radio communication unit 120, a network communication unit 130, a storage unit 140, and a control unit 150.

(Antenna Unit 110)

The antenna unit 110 forms beams in 3-dimensional directions. For example, the antenna unit 110 forms a plurality of beams in different 3-dimensional directions. The antenna unit 110 transmits a signal from the radio communication unit 120 with the beams formed in this way. The 3-dimensional directions of the beams formed by the antenna unit 110 are decided according to the weighting coefficient corresponding to the antenna element. The antenna unit 110 may form a nondirectional beam.

For example, the antenna unit 110 receives a radio signal and outputs the received radio signal to the radio communication unit 120.

The antenna unit 110 includes, for example, a directional antenna capable of forming the beams in the 3-dimensional directions.

(Radio Communication Unit 120)

The radio communication unit 120 performs the radio communication with the UE 200. For example, the radio communication unit 120 performs the radio communication with the UE 200 when the UE 200 is located within a communication region (that is, a virtual cell) corresponding to the beam formed by the antenna unit 110.

For example, the radio communication unit 120 converts a digital signal into an analog signal and performs an analog process on the converted signal. The radio communication unit 120 performs the analog process on a radio signal from the antenna unit 110 and converts the processed analog signal into a digital signal.

(Network Communication Unit 130)

The network communication unit 130 communicates with another device. For example, the network communication unit 130 communicates with another eNodeB.

(Storage Unit 140)

The storage unit 140 stores a program and data for an operation of the eNodeB 100.

(Control Unit 150)

The control unit 150 supplies various functions of the eNodeB 100.

In particular, in the embodiment, a plurality of beams are formed in different 3-dimensional directions by the directional antenna capable of forming the beams in the 3-dimensional directions. In this case, the control unit 150 regards each of the plurality of communication regions corresponding to the individual beams formed by the directional antenna as an imaginary cell (that is, a virtual cell) and performs communication control. That is, the control unit 150 treats each communication region corresponding to the individual beam as the cell.

For example the control unit 150 performs the communication control such that a control signal is generated for each of the individual communication regions (that is, individual virtual cells) of the plurality of communication regions and the control signal is transmitted to the corresponding individual communication region (that is, the individual virtual cell). More specifically, for example, the control unit 150 generates the control signal for each individual virtual cell and causes the antenna unit 110 and the radio communication unit 120 to transmit the control signal to the corresponding individual virtual cell. That is, the control signal for each virtual cell is transmitted with the beam toward the virtual cell.

Referring back to FIG. 12, the control unit 150 generates a control signal of the virtual cell 60A and causes the antenna unit 110 and the radio communication unit 120 to transmit the control signal to the virtual cell 60A. Further, the control unit 150 generates a control signal of the virtual cell 60B and causes the antenna unit 110 and the radio communication unit 120 to transmit the control signal to the virtual cell 60B. That is, the control signal of the virtual cell 60A is transmitted with the beam toward the virtual cell 60A and the control signal of the virtual cell 60B is transmitted with the beam toward the virtual cell 60B.

For example, the control signal includes a control signal used to transmit control information regarding assignment of radio resources. Specifically, for example, the control signal includes a control signal used to transmit information regarding downlink assignment and uplink grant. More specifically, the control signal includes, for example, a control signal transmitted with the physical downlink control channel (PDCCH).

Thus, the control signal for assigning the radio resources can be separately transmitted for each virtual cell. Therefore, the number of control signals for assigning the radio resources which can be transmitted from one eNodeB can be set to be greater than when MU-MIMO is used. That is, an amount of information for assigning the radio resources such as the downlink assignment and the uplink grant can be set to be greater. As a result, since the constraint on a transmission amount of the control signal decreases, more user data can be transmitted. That is, the throughput in the radio communication system 1 can be improved. Thus, when the virtual cell is used, a greater cell-splitting gain can be obtained.

For example, the control signal includes a control signal used to transmit identification information (for example, a cell ID) of the cell. More specifically, for example, the control signal includes a control signal transmitted with a synchronization channel (SCH). For example, the control signal includes a primary synchronization signal (PSS) and a secondary synchronization signal (SSS) transmitted with the SCH.

Thus, the UE 200 can recognize each virtual cell as one cell in cell search. Accordingly, the UE 200 can be caused to regard the virtual cell as one cell and perform the communication.

For example, the control signal includes a common reference signal (CRS). The CRS is multiplied by the weighting coefficient through the complex multiplication and the CRS multiplied by the weighting coefficient through the complex multiplication is transmitted.

Thus, the UE 200 can demodulate the received signal using the CRS. That is, the UE 200 can demodulate another received signal based on the phase of the CRS. Therefore, not only a reception scheme of demodulating a received signal using a channel state information reference signal (CSI-RS) but also a reception scheme of demodulating a received signal using the CRS can be adopted. Accordingly, the reception scheme can be selected more freely in the radio communication system 1.

For example, the control signal includes a control signal corresponding to system information. More specifically, for example, the control signal includes a control signal of the PBCH and a control signal used to transmit the system information in the PDSCH.

5. CONFIGURATION OF UE

Figure 14:
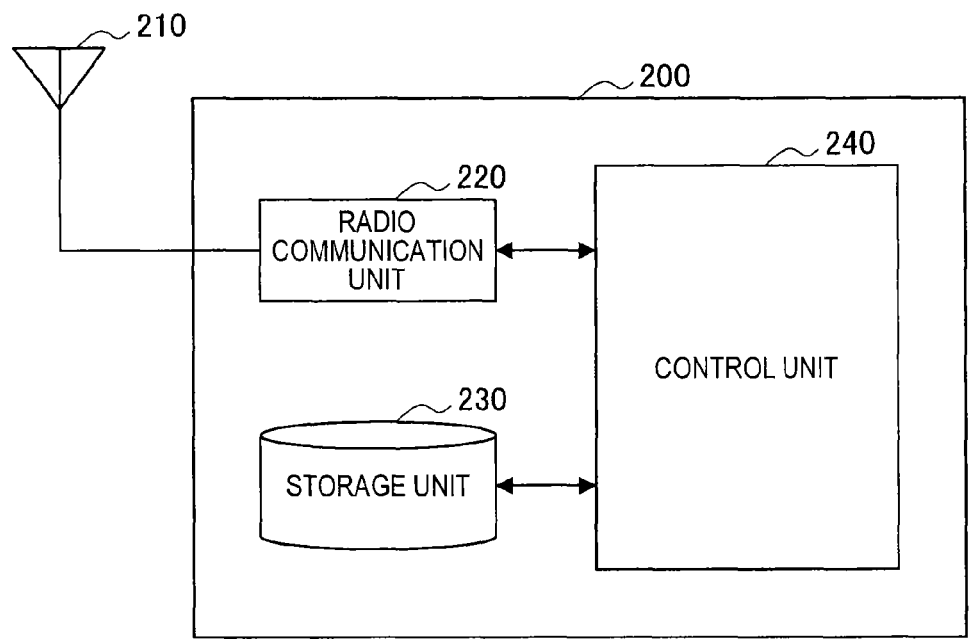
FIG. 14 is a block diagram illustrating an example of the configuration of a UE according to the embodiment.

An example of the configuration of the UE 200 according to the embodiment will be described with reference to FIG. 14. FIG. 14 is a block diagram illustrating an example of the configuration of the UE 200 according to an embodiment. Referring to FIG. 14, the UE 200 includes an antenna unit 210, a radio communication unit 220, a storage unit 230, and a control unit 240.

The antenna unit 210 receives the radio signal and outputs the received radio signal to the radio communication unit 220. The antenna unit 210 transmits a transmission signal output by the radio communication unit 220.

(Radio Communication Unit 220)

The radio communication unit 220 performs the radio communication with the eNodeB 100. More specifically, for example, the UE 200 performs the radio communication with the eNodeB 100 when the UE 200 is located within a communication region (that is, a virtual cell) corresponding to the beam formed by the eNodeB 100.

For example, the radio communication unit 220 converts a digital signal into an analog signal and performs an analog process on the converted signal. The radio communication unit 220 performs the analog process on a radio signal from the antenna unit 210 and converts the processed analog signal into a digital signal.

(Storage Unit 230)

The storage unit 230 stores a program and data for an operation of the UE 200.

(Control Unit 24)

The control unit 240 supplies various functions of the UE 200.

In particular, in the embodiment, the plurality of beams are formed in the different 3-dimensional directions by the eNodeB 100. In this case, the control unit 240 regards each of the plurality of communication regions corresponding to the individual beams formed by the eNodeB 100 as an imaginary cell (that is, a virtual cell) and performs a communication process.

For example, a control signal of each of the individual communication regions (that is, the individual virtual cells) of the plurality of communication regions is generated and the control signal is transmitted to the corresponding individual communication region (that is, the individual virtual cell). When the UE 200 is located within one virtual cell, the control unit 240 acquires the control information of the one virtual cell from the control signal transmitted by the eNodeB 100.

Specifically, for example, the control unit 240 acquires control information (for example, downlink assignment and uplink grant) regarding assignment of the radio resources of the virtual cell from the control signal transmitted with the PDCCH by the eNodeB 100. For example, the control unit 240 acquires the cell ID of the virtual cell from the PSS and the SSS transmitted with the synchronization channel (SCH) by the eNodeB 100. For example, phase information of the CRS is acquired from the CRS transmitted by the eNodeB 100. The phase information is used to demodulate another signal transmitted by the eNodeB 100.

6. FLOW OF PROCESS

Figure 15:
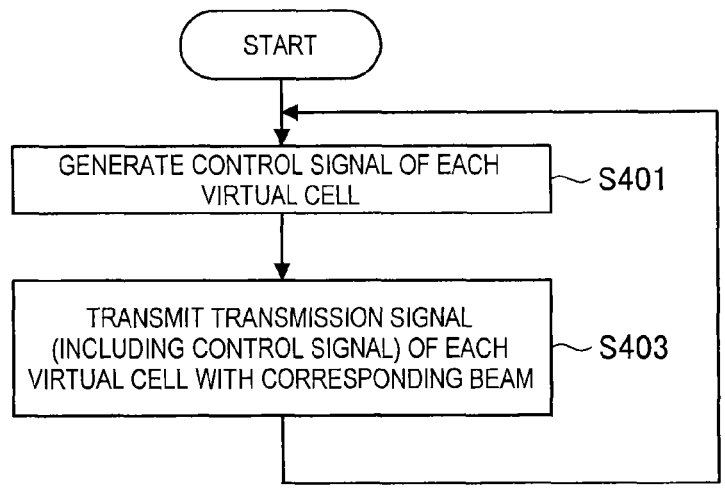
FIG. 15 is a flowchart illustrating an example of a schematic flow of a communication control process according to the embodiment.

Next, a communication control process according to the embodiment will be described with reference to FIG. 15. FIG. 15 is a flowchart illustrating an example of a schematic flow of the communication control process according to the embodiment.

In step S401, the control unit 150 performs the communication control such that the control signal of each individual virtual cell is generated. More specifically, for example, the control unit 150 generates the control signal of each individual virtual cell.

In step S402, the control unit 150 performs the communication control such that the control signal is transmitted to the corresponding individual virtual cell. More specifically, for example, the control unit 150 causes the antenna unit 110 and the radio communication unit 120 to transmit the control signal to the corresponding individual virtual cell. That is, the eNodeB 100 transmits the transmission signal (including the control signal) of each virtual cell with the corresponding beam.

7. FIRST MODIFICATION EXAMPLE

Next, a first modification example of the embodiment will be described with reference to FIGS. 16 to 18.

7.1. Overview

First, an overview of the first modification example of the present invention will be described with reference to FIG. 16.

As described with reference to FIG. 8, there is a possibility of the distance between the macro eNodeB and the virtual cell being larger in the case in which the virtual cell is formed by the macro eNodeB of the macro cell. The beam from the macro eNodeB becomes wider according to the distance. Therefore, when the distance between the macro eNodeB and the virtual cell is large, the radius of the virtual cell may increase. For this reason, it is difficult to dispose the desired number of virtual cells with desired sizes, and consequently there is a possibility of the cell-splitting gain not being sufficiently obtained.

Accordingly, in the first modification example of the embodiment, a virtual cell is formed as a pico cell by a pico eNodeB. That is, the eNodeB 100 is the pico eNodeB. This point will be described specifically with reference to FIG. 16.

FIG. 16 is an explanatory diagram illustrating an example of a case in which a virtual cell is formed by a pico eNodeB. A macro eNodeB 11 and an eNodeB 100 which is a pico eNodeB are illustrated in FIG. 16. As illustrated in FIG. 16, the eNodeB 100 which is the pico eNodeB forms virtual cells 60 as pico cells.

Thus, when the pico eNodeB forms the virtual cells, several advantageous effects can be obtained as follows.

For example, when it is preferable to form the pico cell in a region (for example, near a cell edge) distant from the center of the macro cell and the macro eNodeB forms a pico cell as a virtual cell, the radius of the pico cell may increase. On the other hand, when the pico eNodeB located near the region forms a virtual cell, the radius of the pico cell can be adjusted to a desired size. As a result, the pico cell with a desired size can be formed in the region.

When the pico eNodeB forms the virtual cell, the number of pico eNodeBs to be installed can be suppressed. As a result, it is possible to suppress the cost necessary for the radio communication system 1.

More specifically, about 10 pico eNodeBs can be formed around the macro eNodeB. However, it is impossible to actually form, for example, about 300 pico eNodeBs. Accordingly, for example, by forming about 10 pico eNodeBs around the macro eNodeB and forming about 50 virtual cells in the pico eNodeB, about 500 pico cells which are virtual cells can be formed around the macro eNodeB. Thus, even when the small number of pico eNodeBs are installed, a desired number of pico cells can be formed.

As described above, when the pico cell which is the virtual cell is used, the reception power is nearly uniform across the entire pico cell. Therefore, the ABS itself is not necessary, and thus scheduling of the ABS is not necessary. Thus, the burden of the scheduling by the pico eNodeB is reduced. When the pico cell which is a virtual cell is used, the ABS itself is not necessary. Thus, by using the pico cell which is a virtual cell, it is possible to prevent the throughput of the macro cell from deteriorating.

7.2. Configuration of eNodeB

Next, an example of the configuration of the eNodeB 100 according to the first modification example of the embodiment will be described.

(Antenna Unit 110)

The antenna unit 110 forms a plurality of beams in different 3-dimensional directions. In the first modification example, particularly, each of the plurality of communication regions (that is, each virtual cell) is partially or entirely overlapped by the macro cell. That is, the antenna unit 110 forms each beam so that the communication region (that is, the virtual cell) corresponding to each beam is partially or entirely overlapped by the macro cell.

(Control Unit 150)

In the first modification example, particularly, the virtual cell is referred to as an imaginary pico cell (hereinafter referred to as a "virtual pico cell") partially or entirely overlapped by the macro cell. The control unit 150 regards each of the plurality of communication regions corresponding to the individual beams formed by the directional antenna as an imaginary pico cell (that is, a virtual pico cell) and performs the communication control.

For example, the control unit 150 decides transmission power of the plurality of beams so that the reception power of the beams corresponding to the communication regions is greater than the reception power of the signal transmitted by the macro eNodeB 11 in the individual communication regions (that is, the individual virtual pico cells) of the plurality of communication regions.

Referring back to FIG. 16, for example, the transmission power of the beam is decided so that the reception power of the beam 50A directed toward the virtual cell 60A is greater than the reception power of the signal transmitted by the macro eNodeB 11 in the virtual cell 60A. Further, the transmission power of the beam is decided so that the reception power of the beam 50B directed toward the virtual cell 60B is greater than the reception power of the signal transmitted by the macro eNodeB 11 in the virtual cell 60B. Hereinafter, a specific example of this point will be described with reference to FIG. 17.

Figure 17:
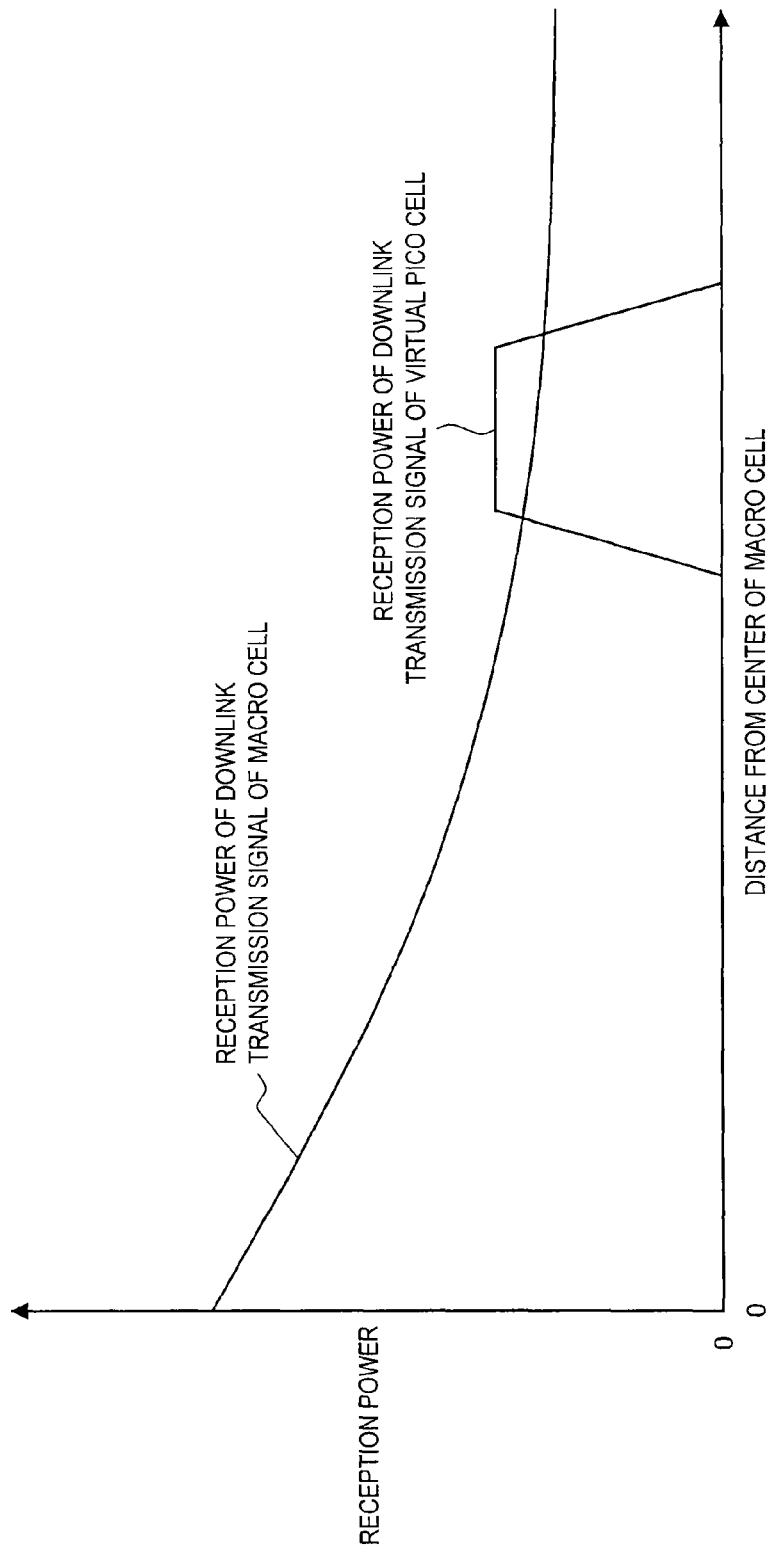
FIG. 17 is an explanatory diagram illustrating an example of reception power in a virtual pico cell.
Figure 18:
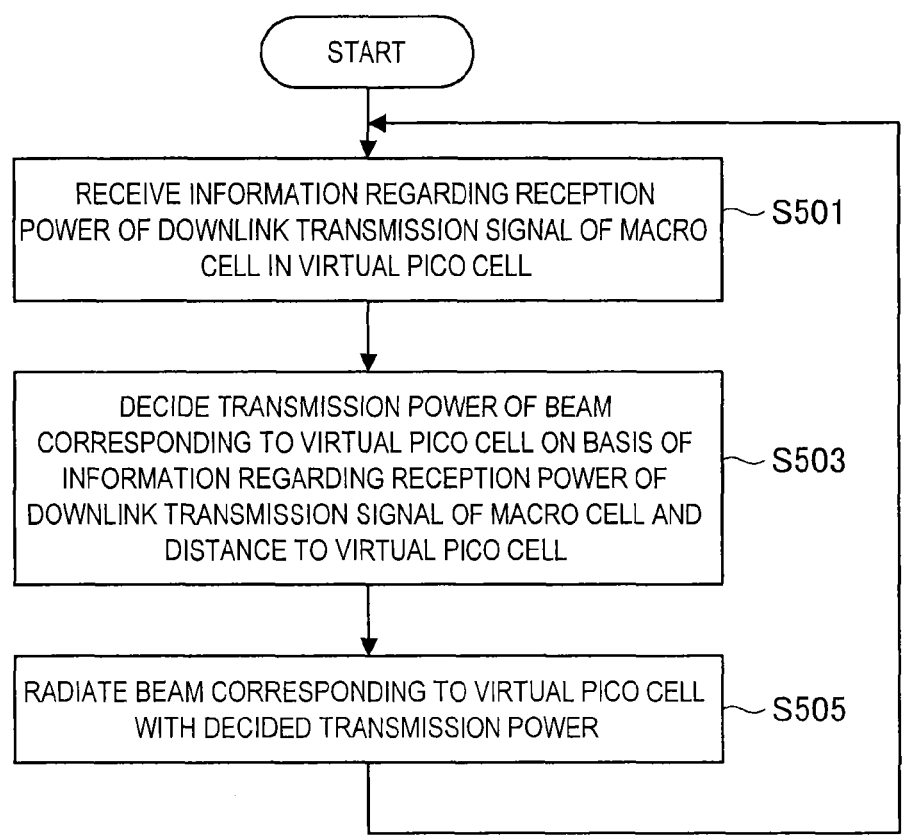
FIG. 18 is a flowchart illustrating an example of a schematic flow of a communication control process according to a first modification example.

FIG. 17 is an explanatory diagram illustrating an example of reception power in a virtual pico cell. A relation between the distance from the center (that is, the position of the macro eNodeB) of the macro cell and the reception power in the distance is illustrated in FIG. 17. Further, reception power of a downlink transmission signal of the macro cell and reception power of a downlink transmission signal (beam) of the pico cell are illustrated. As described above, the reception power of the downlink transmission signal of the macro cell attenuates as the UE becomes distant from the center of the macro cell. On the other hand, the reception power of the beam of the virtual pico cell is nearly uniform in the pico cell. As illustrated in FIG. 17, in the virtual pico cell, the transmission power of the beam is decided so that the reception power of the beam of the virtual pico cell is greater than the reception power of the downlink transmission signal of the macro cell.

For example, the control unit 150 acquires information regarding the reception power of a signal transmitted by the macro eNodeB 11 and the reception power in the individual communication region (that is, the individual virtual pico cell) of the plurality of communication regions. Then, the control unit 150 decides the transmission power of the beam corresponding to the individual communication region based on the acquired information.

Referring back to FIG. 16, for example, the UE 200 receives the transmission signal of the macro eNodeB in the virtual pico cell 60 and measures the reception power. Then, the UE 200 notifies the eNodeB 100 of a measurement result. For example, the UE 200A measures the reception power of the transmission signal of the macro eNodeB 11 in the virtual pico cell 60A and notifies the eNodeB 100 of the measurement result. The control unit 150 of the eNodeB 100 decides the transmission power of the beam 50A based on the measurement result of the reception power in the virtual pico cell 60A. For example, the control unit 150 decides the transmission power of the beam 50 so that the reception power of the beam 50A is greater than the notified reception power in consideration of the attenuation of the power according to the distance from the eNodeB 100 to the virtual pico cell 60A.

The macro eNodeB 11 may be notified of the measurement result of the reception power and the macro eNodeB 11 may notify the eNodeB 100 of the measurement result of the reception power.

The control unit 150 may decide the transmission power of the beam 50 based on an estimated value of the reception power of the transmission signal of the macro eNodeB in the virtual pico cell 60 instead of the measurement result of the reception power. For example, the estimated value can be calculated based on the distance between the macro eNodeB 11 and the virtual pico cell 60 and the transmission power of the macro eNodeB. Thus, the information regarding the reception power acquired by the control unit 150 may be the measurement result of the reception power or may be the estimated value of the reception power.

As described above, by deciding the power of the beam 50, it is possible to reduce the influence of the interference by the transmission signal of the macro eNodeB in the virtual pico cell 60. As a result, the UE 200 can perform the radio communication with the eNodeB 100 in the virtual pico cell 60.

7.3. Flow of Process

Next, a communication control process according to the embodiment will be described with reference to FIG. 18. FIG. 18 is a flowchart illustrating an example of a schematic flow of the communication control process according to the first modification example of the embodiment.

In step S501, the control unit 150 acquires the information (for example, the measurement result of the reception power) regarding the reception power of the downlink transmission signal of the macro cell in the virtual cell.

In step S503, the control unit 150 decides the transmission power of the beam corresponding to the virtual pico cell based on the information regarding the reception power of the downlink transmission signal of the macro cell and the distance between the eNodeB 100 and the virtual pico cell.

In step S505, the antenna unit 110 radiates the beam corresponding to the virtual pico cell with the decided transmission power. For example, the transmission power is adjusted by an amplifier included in the radio communication unit 120.

8. SECOND MODIFICATION EXAMPLE

Next, a second modification example of the embodiment will be described with reference to FIGS. 19 to 21.

8.1. Overview

First, an overview of the second modification example of the embodiment will be described with reference to FIG. 19.

(Technical Problem)

In MU-MIMO of the related art, the UE specifies a weighting coefficient preferable for the UE among weighting coefficients of the beamforming.

First, each UE receives a downlink reference signal (RS) to acquire downlink channel information (for example, a channel matrix). Then, each UE virtually calculates an amount of the reception power of the UE when each weighting coefficient candidate of the beamforming is used by the eNodeB based on the channel information. That is, the UE virtually calculates the reception power in regard to all of the weighting coefficient candidates. Thereafter, the UE selects the weighting coefficient candidate for which large reception power occurs among the weighting coefficient candidates of the beamforming. Then, the UE specifies the selected weighting coefficient candidate as a preferable weighting coefficient.

When normal cells are formed, the UE specifies a cell preferable for communication among the nearby cells as follows.

Each UE actually receives the RS individually set for each cell and measures the reception power. The RS is referred to as a cell-specific reference signal. The RS is basically the same as a common reference signal (CRS). Each UE selects the cell corresponding to large reception power. Then, the UE specifies the selected cell as a cell preferable for the communication.

Here, when the virtual cell preferable for the UE 200 is specified (in other words, the weighting coefficient of the beamforming preferable for the UE 200 is specified), the scheme of specifying the preferable weighting coefficient or the scheme of specifying the preferable cell, as described above, can also be considered to be adopted. However, when such schemes are adopted, new concerns may arise.

For example, when the scheme of specifying the preferable weighting coefficient is adopted, virtual calculation occurs in the UE 200. For example, when the directional antenna includes about 100 antenna elements, the number of weighting coefficient candidates is vast and a calculation amount is considerably large. Accordingly, the burden on the UE 200 may increase.

On the other hand, when the scheme of specifying the preferable cell is adopted, the UE actually measures the reception power of the signal of the virtual cell. In general, in this scheme, it takes some time to measure the reception power and there is a bigger concern in the case of the virtual cell. This point will be described in detail below.

In the case of a normal cell, as described with reference to FIG. 6, the reception power of the downlink transmission signal of the cell gradually attenuates as the UE becomes distant from the center of the cell. Therefore, when the UE becomes distant from the center of the cell, the reception power of the signal of the cell attenuates and the reception power of the signal of a cell adjacent to the cell increases. Therefore, the UE can perform smooth handover.

In the case of the virtual cell, however, as described with reference to FIG. 7, the reception power of the downlink transmission signal of the virtual cell is not almost changed within the virtual cell and the reception power of the transmission signal sharply decreases in the cell edge of the virtual cell. When the UE becomes distant from the center of the virtual cell more than the cell edge, the reception power of the signal of the virtual cell drastically decreases.

Therefore, it is very difficult for the UE to receive the signal of the virtual cell adjacent to the virtual cell in which the UE is currently located and measure the reception power. Since the reception power sharply decreases in the cell edge, the UE specifies a new cell after the reception power sharply decreases. Accordingly, the handover may be late.

(Resolution Method)

Accordingly, in the second modification example of the embodiment, the eNodeB 100 transmits some of the CRSs with the nondirectional beams and transmits the remaining CRSs with the directional beams. That is, some of the CRSs are transmitted without multiplication of the weighting coefficient and the remaining CRSs are transmitted after the multiplication of the weighting coefficient. Here, some of the CRSs are referred to as nondirectional CRSs and the remaining CRSs are referred to as directional CRSs. The eNodeB 100 transmits, to the UE, a weighting coefficient V of the beam in regard to each of a plurality of virtual cells (hereinafter referred to as "adjacent virtual cells") adjacent to the virtual cell in which the UE is currently located.

Then, the UE 200 receives the nondirectional CRSs to acquire channel information (for example, a channel matrix H). The UE 200 receives the weighting coefficient V of the beam in regard to each of the plurality of adjacent virtual cells. Thereafter, the UE 200 specifies the virtual cell suitable for the handover based on the channel information and the weighting coefficient V of the beam in regard to each of the plurality of adjacent virtual cells.

8.2. Configuration of eNodeB

Next, an example of the configuration of the eNodeB 100 according to the second modification example of the embodiment will be described.

(Control Unit 150)

—Transmission of Nondirectional CRS

When the plurality of beams are formed in different 3-dimensional directions by the directional antenna capable of forming the beams in the 3-dimensional directions, there are the plurality of communication regions corresponding to the individual beams formed by the directional antenna. In particular, in the second modification example of the embodiment, the CRS of each of the individual communication regions (that is, the virtual cells) of the plurality of communication regions is transmitted with the corresponding beam among the plurality of beams. For example, the CRS (that is, the directional CRS) of each virtual cell is transmitted with the directional beam of the directional antenna. The common CRS to the plurality of communication regions is transmitted with the nondirectional beam formed by the directional antenna. For example, the common CRS (that is, the nondirectional CRS) to the virtual cells is transmitted with the nondirectional beam of the directional antenna.

The control unit 150 performs the communication control such that the CRS of each virtual cell is transmitted with the corresponding beam among the plurality of beams. The control unit 150 performs the communication control such that the common CRS to the virtual cells is transmitted with the nondirectional beam. More specifically, for example, the control unit 150 generates the CRS of each individual virtual cell and causes the antenna unit 110 and the radio communication unit 120 to transmit the CRS to the corresponding individual virtual cell. The control unit 150 generates the common CRS to the virtual cells and causes the antenna unit 110 and the radio communication unit 120 to transmit the CRS with the nondirectional beam. Hereinafter, specific examples of the directional CRS and the nondirectional CRS will be described with reference to FIG. 19.

Figure 19:
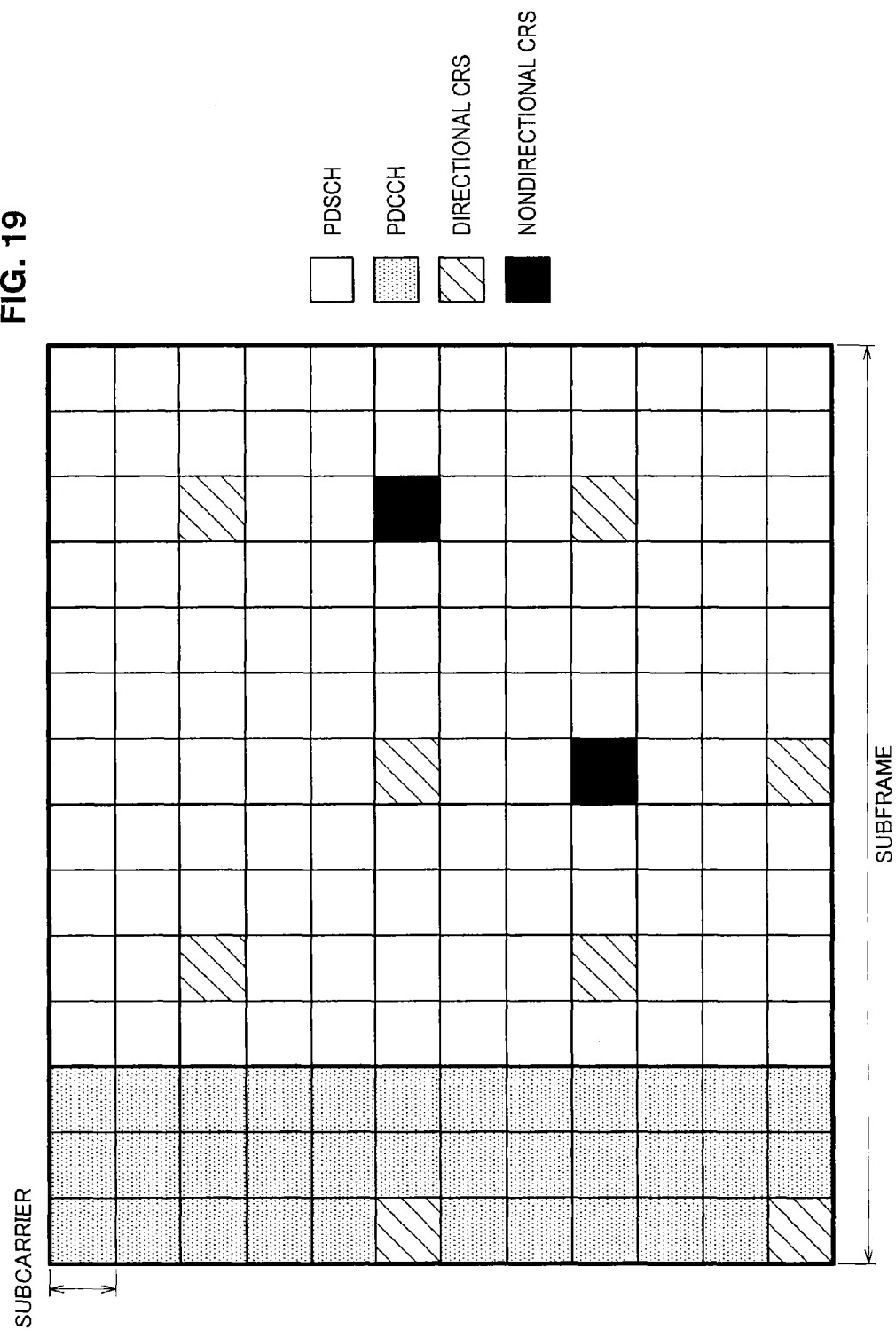
FIG. 19 is an explanatory diagram illustrating examples of a directional CRS and a nondirectional CRS.

FIG. 19 is an explanatory diagram illustrating examples of the directional CRS and the nondirectional CRS. A radio source (that is, two resource blocks) that has a width of 12 subcarriers in a frequency direction and a width of 1 subframe in a time direction is illustrated in FIG. 19. Of the CRSs, some of the CRSs are the nondirectional CRSs. Of the CRSs, the remaining CRSs are the directional CRSs. For example, the nondirectional CRSs and the directional CRSs can be transmitted in this way.

When the nondirectional CRSs are transmitted, the UE 200 can obtain the channel information indicating a channel between the eNodeB 100 and the UE 200. That is, since the directional CRS is multiplied by the weighting coefficient, it is difficult to obtain the same channel information as that of the related art from the directional CRS. Since the nondirectional CRS is not multiplied by any of the weighting coefficients, the same channel information as that of the related art can be obtained from the nondirectional CRS.

—Transmission of Weighting Coefficient of Adjacent Virtual Cell

For example, the control unit 150 supplies the UE 200 located in one communication region (that is, the virtual cell) of the plurality of communication regions with the weighting coefficient of the beam corresponding to the communication region (that is, the adjacent virtual cell) adjacent to the communication region in which the UE 200 is located. More specifically, for example, the control unit 150 specifies the virtual cell adjacent to the virtual cell in which the UE 200 is located. Then, the control unit 150 acquires the weighting coefficient of the beam corresponding to the adjacent virtual cell. Thereafter, the control unit 150 causes the radio communication unit 120 to transmit the weighting coefficient to the UE 200. For example, the control unit 150 generates the system information including information indicating an adjacent relation between the virtual cells and the information indicating the weighting coefficient corresponding to each virtual cell and causes the radio communication unit 120 to transmit the system information. The number of adjacent virtual cells of one virtual cell may be about 2 or 3.

Even when the reception power of the signal of the adjacent virtual cell may not actually be measured based on the weighting coefficient and the channel information, as will be described below, the UE 200 can virtually calculate the reception power of the signal of the adjacent virtual cell.

8.3. Configuration of UE

Next, an example of the configuration of the eNodeB 100 according to the second modification example of the embodiment will be described.
(Control Unit 240)

The control unit 240 acquires, from the eNodeB 100, the weighting coefficient of the beam corresponding to the communication region (that is, the adjacent virtual cell) adjacent to the communication region (that is, the virtual cell) in which the UE 200 is located among the plurality of communication regions.

For example, the control unit 240 acquires the information indicating the adjacent relation of the virtual cell from the system information. The control unit 240 specifies the adjacent cell of the virtual cell in which the UE 200 is located. The control unit 240 acquires the weighting coefficient of the beam corresponding to the specific virtual cell from the system information.

The control unit 240 acquires the channel information indicating the channel between the eNodeB 100 and the UE 200 from the reception result of the CRS which is the CRS transmitted with the nondirectional beam by the eNodeB 100 and is the common CRS to the plurality of communication regions (that is, the plurality of virtual cells). Then, the control unit 240 specifies the communication region (that is, the adjacent virtual cell) suitable for the handover based on the acquired weighting coefficient and channel information.

More specifically, for example, the control unit 240 acquires the channel matrix H indicating the channel between the eNodeB 100 and the UE 200 from the reception result of the nondirectional CRS. Then, the control unit 250 multiples the channel matrix H by the weighting coefficient V of the beam corresponding to the adjacent virtual cell. Thus, the control unit 240 virtually calculates the reception power when the UE 200 receives the beam corresponding to the adjacent virtual cell. The control unit 240 specifies the adjacent virtual cell suitable for the handover from the virtually calculated reception power. The control unit 240 notifies the eNodeB 100 of the specified adjacent virtual cell via the radio communication unit 220.

It is difficult for the UE 200 to actually measure the reception power of the signal of the adjacent virtual cell, but the reception power can be virtually calculated according to the scheme. Accordingly, it is possible to specify the adjacent virtual cell suitable for the handover satisfactorily. Since the actual measurement of the reception power is not involved, the scheme can be performed at a higher speed.

Since a target is restricted to the adjacent virtual cell, an increase in a processing amount is suppressed. This point also enables the above-described scheme to be performed at a higher speed.

8.3. Flow of Process

Next, the communication control process according to the second modification example of the embodiment will be described with reference to FIGS. 20 and 21.
—Process of UE 200

Figure 20:
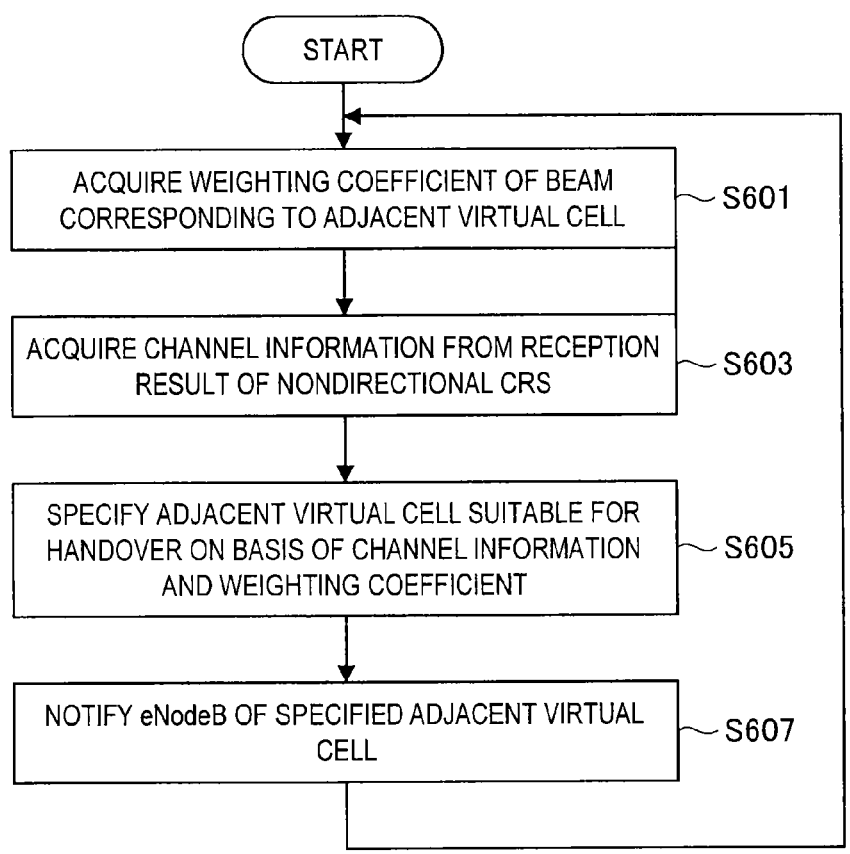
FIG. 20 is a flowchart illustrating an example of a schematic flow of a communication control process of a UE according to a second modification example.

FIG. 20 is a flowchart illustrating an example of a schematic flow of the communication control process of the UE 200 according to the second modification example of the embodiment.

In step S601, the control unit 240 acquires the weighting coefficient of the beam corresponding to the adjacent virtual cell of the virtual cell in which the UE 200 is located, from the eNodeB 100.

In step S603, the control unit 240 acquires the channel information indicating the channel between the eNodeB 100 and the UE 200 from the reception result of the nondirectional CRS transmitted with the nondirectional beam by the eNodeB 100.

In step S605, the control unit 240 specifies the adjacent virtual cell suitable for the handover based on the acquired weighting coefficient and channel information.

In step S607, the control unit 240 notifies the eNodeB 100 of the specified adjacent virtual cell via the radio communication unit 220.
—Process of eNodeB 100

Figure 21:
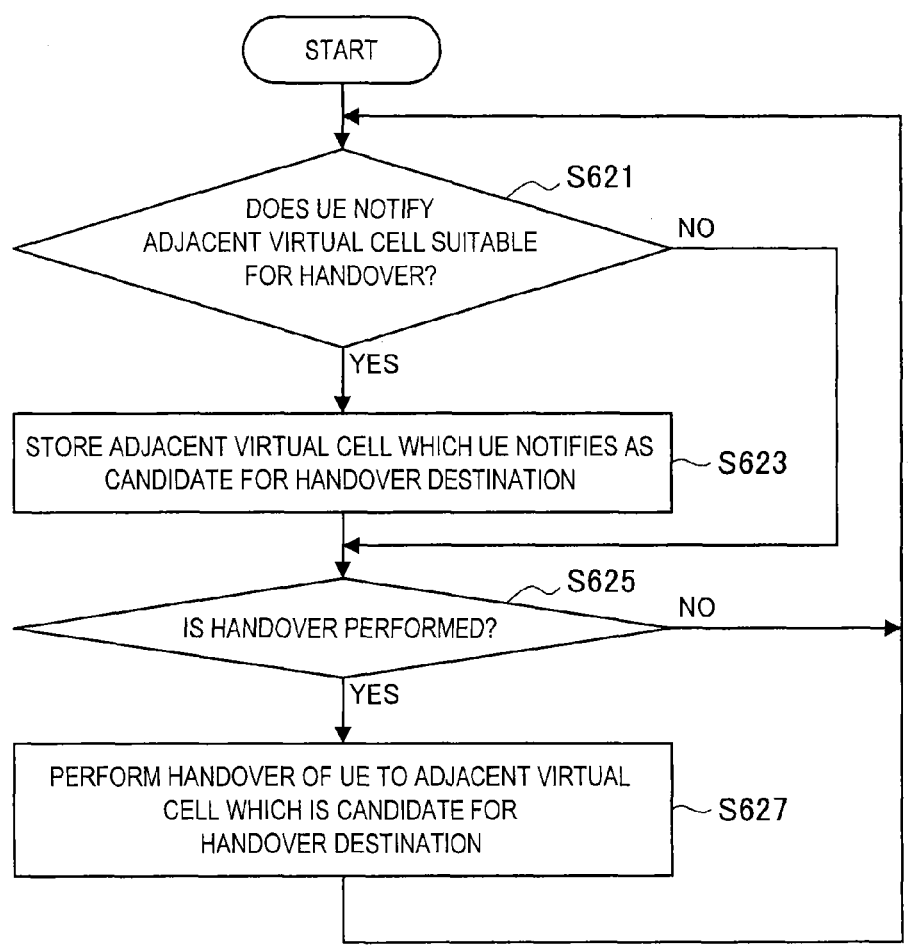
FIG. 21 is a flowchart illustrating an example of a schematic flow of a communication control process of an eNodeB according to the second modification example.

FIG. 21 is a flowchart illustrating an example of a schematic flow of the communication control process of the eNodeB 100 according to the second modification example of the embodiment.

In step S621, the control unit 150 determines whether the UE 200 notifies the adjacent virtual cell suitable for the handover. When the adjacent virtual cell is notified of, the process proceeds to step S623. Otherwise, the process proceeds to step S625.

In step S623, the control unit 150 stores the adjacent virtual cell of which the UE 200 notifies as a candidate for a handover destination in the storage unit 140.

In step S625, the control unit 150 determines whether the handover of the UE 200 is performed. When the handover of the UE 200 is performed, the process proceeds to step S627. Otherwise, the process returns to step S621.

In step S627, the control unit 150 performs the handover of the UE 200 to the adjacent virtual cell which is the candidate for the handover destination. Then, the process returns to step S621.

The second modification example of the embodiment has been described above. In the above-described embodiment, the eNodeB 100 transmits both of the directional CRS and the nondirectional CRS, but the second modification example is not limited thereto.

For example, the eNodeB 100 may not transmit the directional CRS. That is, the eNodeB 100 may transmit all of the CRSs with the nondirectional beams. That is, the control signal of each virtual cell may not include the CRS and the common CRS to the plurality of virtual cells may be transmitted with the nondirectional beam formed by the directional antenna.

Thus, the UE 200 does not necessarily distinguish the directional CRS from the nondirectional CRS and can acquire the channel information from the reception result of the CRS.

9. THIRD MODIFICATION EXAMPLE

Next, a third modification example of the embodiment will be described with reference to FIGS. 22 to 27.

9.1. Overview

First, an overview of the third modification example of the embodiment will be described.

As described above, the normal pico cell formed by the normal pico eNodeB is basically unable to be moved. In order to move the normal pico cell, it is necessary to move the pico eNodeB itself. When the normal pico cell is added, it is necessary to newly install a pico eNodeB.

In the macro cell, the UE moves, and thus a change in traffic can typically occur. Actually, even when the pico cell is preferably formed in a region in which traffic is great, the pico cell may not be formed quickly and easily.

On the other hand, since the pico cell which is a virtual cell is formed by the beam, the pico cell can be easily moved by changing a weighting coefficient for forming the beam. The pico cell which is a virtual cell can be easily added by forming a new beam. The pico cell which is a virtual cell may also be deleted easily.

Accordingly, in the third modification example of the embodiment, the eNodeB 100 adds, deletes, or changes the virtual cell by controlling forming of the beam by the directional antenna.

Thus, since the pico cell which is a virtual cell can be added, deleted, or changed flexibly, the radio communication system 1 can be disposed and administrated more flexibly. Since the virtual cell can be formed quickly in a region in which traffic is great, it is possible to improve the throughput of the radio communication system 1.

9.2. Configuration of eNodeB

Next, an example of the configuration of the eNodeB 100 according to the third modification example of the embodiment will be described.
(Control Unit 150)

In the third modification example of the embodiment, the control unit 150 controls the forming of the beam of the directional antenna capable of forming the beam in the 3-dimensional direction. More specifically, for example, the control unit 150 controls the forming of the beam of the directional antenna by deciding the weighting coefficient by which a transmission signal corresponding to each antenna element of the directional antenna is multiplied through complex multiplication.

In the third modification example of the embodiment, particularly, the control unit 150 adds, deletes, or changes the virtual cell (that is, a communication region regarded as a virtual cell) by controlling the forming of the beam of the directional antenna.
—Addition of Virtual Cell For example, the control unit 150 adds the virtual cell. More specifically, for example, the control unit 150 selects one virtual cell candidate from a plurality of virtual cell candidates and adds the selected virtual cell candidate as a new virtual cell. Hereinafter, a specific example of this point will be described with reference to FIG. 22.

Figure 22:
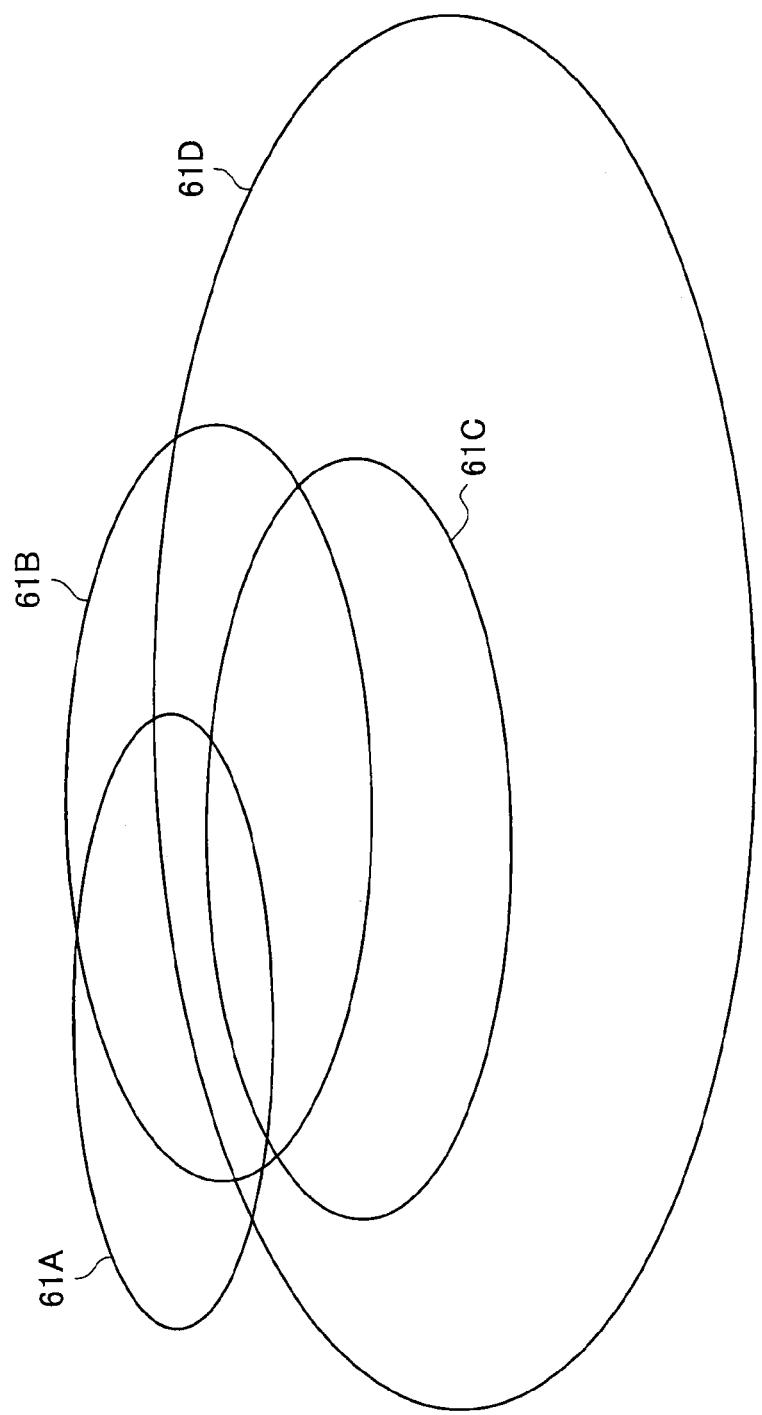
FIG. 22 is an explanatory diagram illustrating examples of virtual cell candidates.

FIG. 22 is an explanatory diagram illustrating examples of virtual cell candidates. Four virtual cell candidates 61 are illustrated in FIG. 22. In this way, the virtual cell candidates 61 may overlap. However, preferably, the virtual cell candidates to be selected (that is, the virtual cell candidates that will become virtual cells) do not overlap. This is because interference occurs.

For example, the control unit 150 acquires a channel matrix $H_{UL}$ of an uplink in regard to each UE 400 and acquires a transposed matrix $H_{UL}^T$ of this matrix as a channel matrix $H_{DL}$ of a downlink. Then, the control unit 150 multiplies the channel matrix $H_{DL}$ of the downlink by the weighting matrix V corresponding to each virtual cell candidate in regard to each UE 400. Thus, the performance of each UE is calculated. Then, the control unit 150 selects a preferable virtual cell candidate (in other words, a preferable weighting coefficient) based on a calculation result of the performance of each UE. In this way, the virtual cell can be appropriately added according to the movement of the UE 200, an increase or decrease in the traffic, or the like.
—Change in Virtual Cell For example, the control unit 150 changes the virtual cell. More specifically, for example, the control unit 150 changes the position of the virtual cell, the size of the radius of the virtual cell, and the transmission power of the beam corresponding to the virtual cell (consequently, the transmission power or the reception power of the virtual cell) of the beam corresponding to the virtual cell.

The virtual cell may be changed by a combination of the deletion of the existing virtual cell and the addition of a new virtual cell.
—Stepwise Change in Beam Corresponding to Virtual Cell For example, the control unit 150 adds, deletes, or changes the virtual cell step by step by controlling the forming of the beam of the directional antenna so that the beam formed by the directional antenna is changed step by step.

More specifically, for example, the control unit 150 controls the forming of the beam of the directional antenna so that the size of the communication region (that is, the virtual cell) corresponding to the beam formed by the directional antenna is changed step by step. That is, the control unit 150 controls the forming of the beam of the directional antenna so that the width of the beam formed by the directional antenna is changed step by step. Hereinafter, a specific example of this point will be described with reference to FIG. 23.

Figure 23:
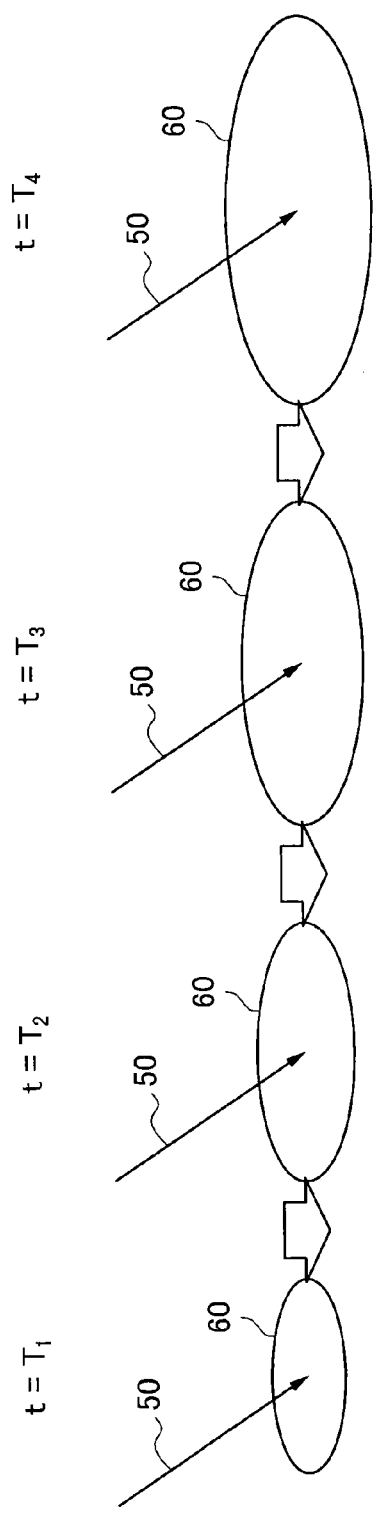
FIG. 23 is an explanatory diagram illustrating an example of a stepwise change in the size of a virtual cell.

FIG. 23 is an explanatory diagram illustrating an example of a stepwise change in the size of the virtual cell. The beam 50 and the virtual cell 60 at times $T_1$ to $T_4$ are illustrated in FIG. 23. For example, when the virtual cell 60 is added or the existing virtual cell 60 is further enlarged, the eNodeB 100 thus enlarges the virtual cell 60 step by step. To change the size of the virtual cell 60 step by step, the control unit 150 enlarges the width of the beam corresponding to the virtual cell 60 step by step. That is, the control unit 150 changes the weighting coefficient in regard to the directional antenna step by step.

In contrast to the example of FIG. 23, for example, when the virtual cell 60 is deleted or the existing virtual cell 60 is further reduced, the eNodeB 100 reduces the virtual cell 60 step by step. To change the size of the virtual cell 60 step by step, the control unit 150 reduces the width of the beam corresponding to the virtual cell 60 step by step. That is, the control unit 150 changes the weighting coefficient in regard to the directional antenna step by step.

For example, the control unit 150 controls the forming of the beam of the directional antenna so that the transmission power of the beam formed by the directional antenna is changed step by step. Hereinafter, a specific example of this point will be described with reference to FIG. 24.

Figure 24:
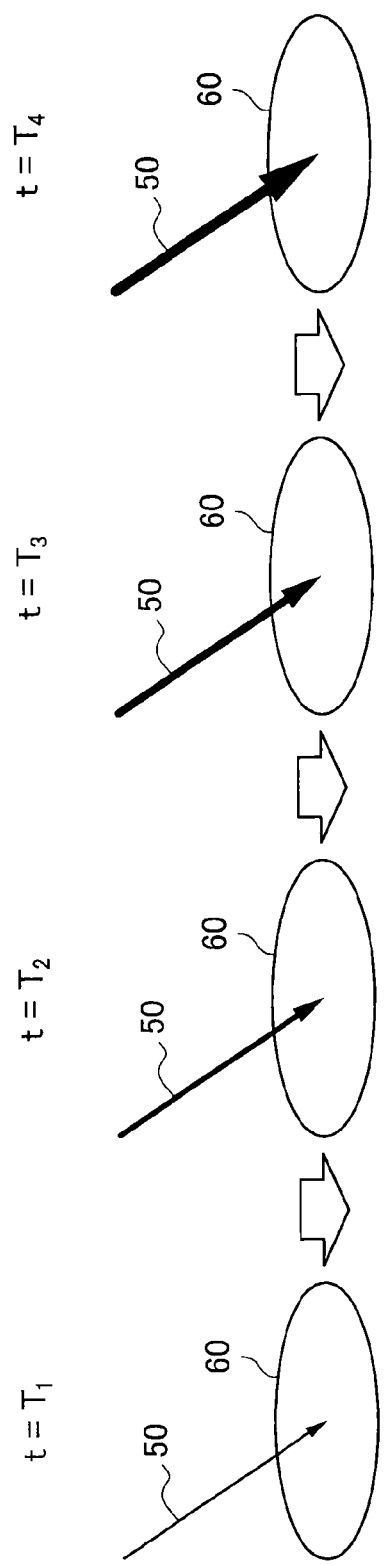
FIG. 24 is an explanatory diagram illustrating an example of a stepwise change in transmission power of a beam.

FIG. 24 is an explanatory diagram illustrating an example of a stepwise change in transmission power of a beam. The beam 50 and the virtual cell 60 at times $T_1$ to $T_4$ are illustrated in FIG. 24. For example, when the virtual cell 60 is added or the transmission power of the existing virtual cell 60 is further increased, the eNodeB 100 thus increases the transmission power of the beam corresponding to the virtual cell 60 step by step. That is, the control unit 150 changes the magnitude of the transmission power of the beam step by step.

In contrast to the example of FIG. 24, when the virtual cell 60 is deleted or the transmission power of the existing virtual cell 60 is further decreased, the eNodeB 100 decreases the transmission power of the beam corresponding to the virtual cell 60 step by step. That is, the control unit 150 changes the magnitude of the transmission power of the beam step by step.

The control unit 150 may change the size of the communication region (that is, the virtual cell) corresponding to the beam formed by the directional antenna step by step and control the forming of the beam so that the transmission power of the beam formed by the directional antenna is changed step by step. Hereinafter, a specific example of this point will be described with reference to FIG. 25.

Figure 25:
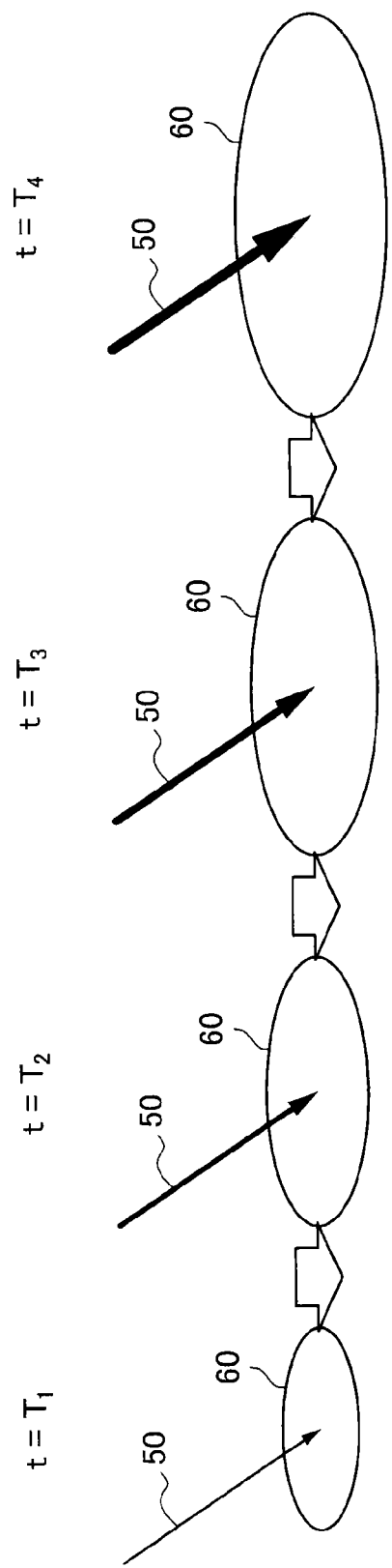
FIG. 25 is an explanatory diagram illustrating examples of stepwise changes in the size of a virtual cell and transmission power of a beam.

FIG. 25 is an explanatory diagram illustrating examples of stepwise changes in the size of a virtual cell and transmission power of a beam. The beam 50 and the virtual cell 60 at times $T_1$ to $T_4$ are illustrated in FIG. 25. For example, when the virtual cell 60 is added, the eNodeB 100 may thus enlarge the virtual cell 60 step by step (that is, enlarges the width of the beam corresponding to the virtual cell step by step) and increase the transmission power of the beam step by step.

In contrast to the example of FIG. 25, for example, when the virtual cell 60 is deleted, the eNodeB 100 may reduce the virtual cell 60 step by step (that is, decrease the width of the beam corresponding to the virtual cell step by step) and reduce the transmission power of the beam step by step.

By changing the beam step by step in this way, it is possible to reduce the influence of the addition, deletion, and change in the virtual cell on the existing communication.

For example, when the virtual cell is added, a virtual cell abruptly appears, and the UE 200 is located within or near the virtual cell, the signal of the virtual cell can interfere with the existing communication of the UE 200. On the other hand, when the transmission power is gradually increased or the size of the virtual cell is gradually enlarged, the UE 200 can perform handover at the time point at which the virtual cell is a handover target. Accordingly, the influence on the existing communication of the UE 200 is small.

For example, when the virtual cell is deleted, the virtual cell abruptly disappears, and the UE 200 is located within or near the virtual cell, a link of failure (LOF) of the UE 200 can occur. On the other hand, when the transmission power is gradually decreased or the size of the virtual cell is gradually contracted, the UE 200 can perform handover to another virtual cell (or a normal cell) before the virtual cell disappears. Accordingly, the influence on the existing communication of the UE 200 is small.

For example, even when the virtual cell is changed, the influence on the existing communication of the UE 200 is small, as in the addition or deletion of the virtual cell.

As described above, the virtual cell can be changed by combining the deletion of the existing virtual cell and the addition of a new virtual cell. In this case, for example, the power or the width of the beam can be adjusted so that the handover of the UE 200 is performed from the existing virtual cell to a new virtual cell during execution of the order of the deletion of the existing virtual cell and the addition of the new virtual cell.

9.3. Flow of Process

Next, a communication control process according to the third modification example of the embodiment will be described with reference to FIGS. 26 and 27. Here, an example of the communication control process at the time of the addition of the virtual cell and an example of the communication control process at the time of the deletion of the virtual cell will be described as the examples of the communication control process.

—Addition of Virtual Cell

Figure 26:
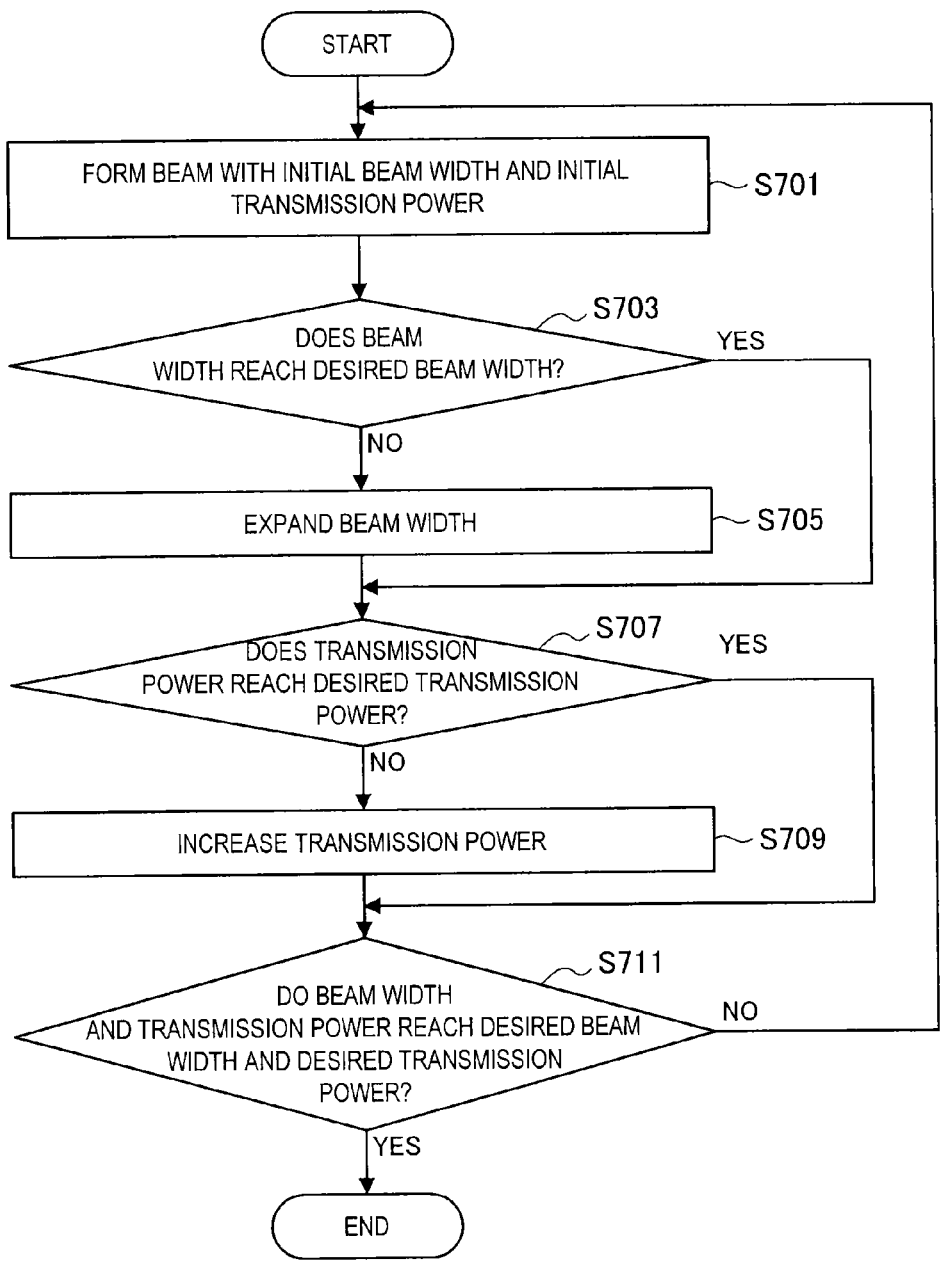
FIG. 26 is a flowchart illustrating an example of a schematic flow of a communication control process at the time of the addition of a virtual cell according to a third modification example.

FIG. 26 is a flowchart illustrating an example of a schematic flow of a communication control process at the time of the addition of the virtual cell according to the third modification example of the embodiment.

In step S701, the control unit 150 causes the antenna unit 110 and the radio communication unit 120 to form the beam with an initial beam width and initial transmission power.

In step S703, the control unit 150 determines whether the beam width reaches a desired beam width. When the beam width reaches the desired beam width, the process proceeds to step S707. Otherwise, the process proceeds to step S705.

In step S705, the control unit 150 expands the beam width. That is, the control unit 150 changes the weighting coefficient in regard to the directional antenna.

In step S707, the control unit 150 determines whether the transmission power reaches the desired transmission power. When the transmission power reaches the desired transmission power, the process proceeds to step S711. Otherwise, the process proceeds to step S709.

In step S709, the control unit 150 increases the transmission power.

In step S711, the control unit 150 determines whether the beam width and the transmission power reach the desired beam width and the desired transmission power. When the beam width and the transmission power reach the desired beam width and the desired transmission power, the process ends. Otherwise, the process returns to step S701.

—Deletion of Virtual Cell

Figure 27:
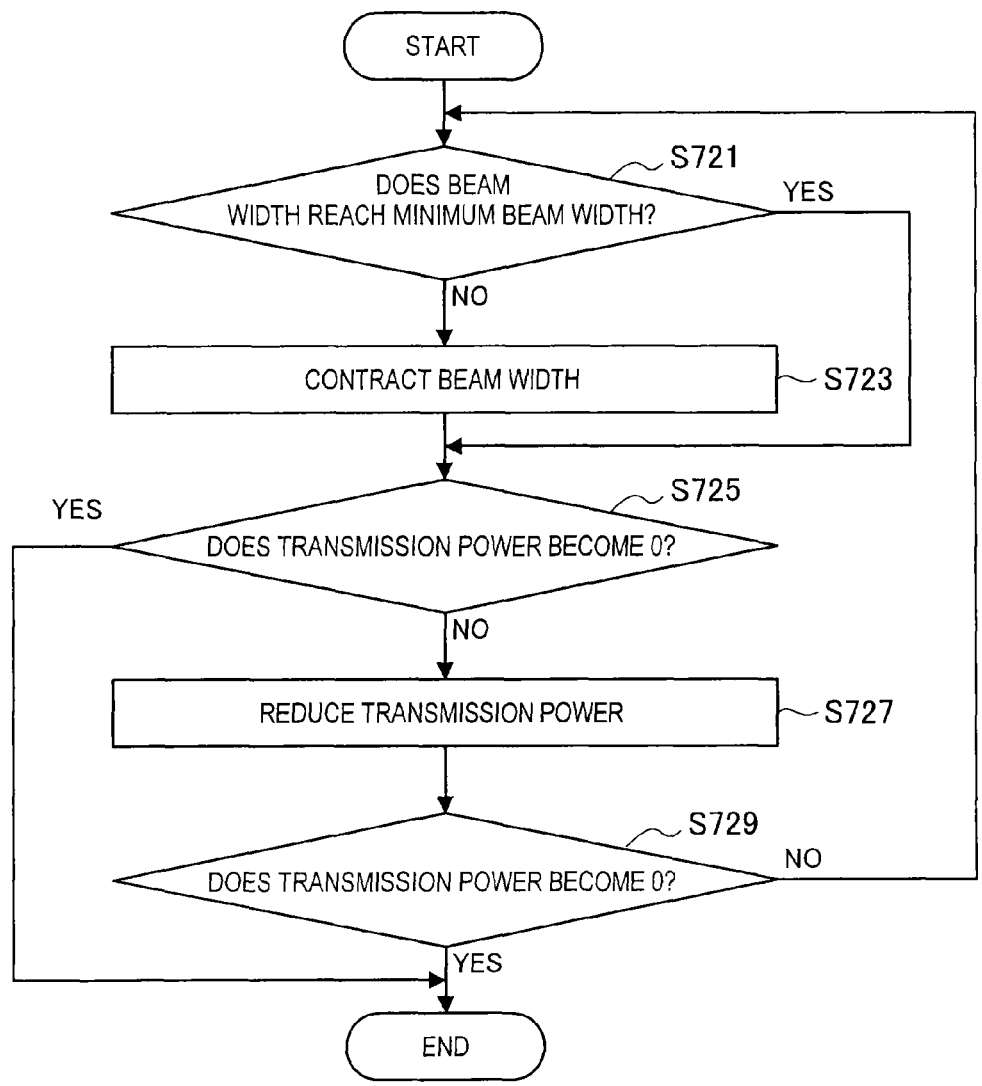
FIG. 27 is a flowchart illustrating an example of a schematic flow of a communication control process at the time of deletion of a virtual cell according to the third modification example.

FIG. 27 is a flowchart illustrating an example of a schematic flow of a communication control process at the time of the deletion of the virtual cell according to the third modification example of the embodiment.

In step S721, the control unit 150 determines whether the beam width reaches a minimum beam width. When the beam width reaches the minimum beam width, the process proceeds to step S725. Otherwise, the process proceeds to step S723.

In step S723, the control unit 150 contracts the beam width. That is, the control unit 150 changes the weighting coefficient in regard to the directional antenna.

In step S725, the control unit 150 determines whether the transmission power becomes 0. When the transmission power becomes 0, the process ends. Otherwise, the process proceeds to step S729.

In step S727, the control unit 150 reduces the transmission power.

In step S729, the control unit 150 determines whether the transmission power becomes 0. When the transmission power becomes 0, the process ends. Otherwise, the process returns to step S721.

10. APPLICATION EXAMPLES

The technology related to the present disclosure can be applied to various products. For example, the eNodeB 100 may be realized as an eNodeB 800 including a body (also referred to as a base station device) controlling radio communication and an antenna. Alternatively, the eNodeB 100 may be realized as an eNodeB 830 including a body controlling radio communication, one or more remote radio heads (RRHs) disposed in different locations from the body, and an antenna.

In addition, the UE 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 200 may also be realized as a terminal that conducts machine-to-machine (M2M) communication (also called a machine-type communication (MTC) terminal). Furthermore, the UE 200 may be a radio communication module mounted onboard these terminals (for example, an integrated circuit module configured on a single die).

10.1. Applications Related to eNodeB (First Application)

Figure 28:
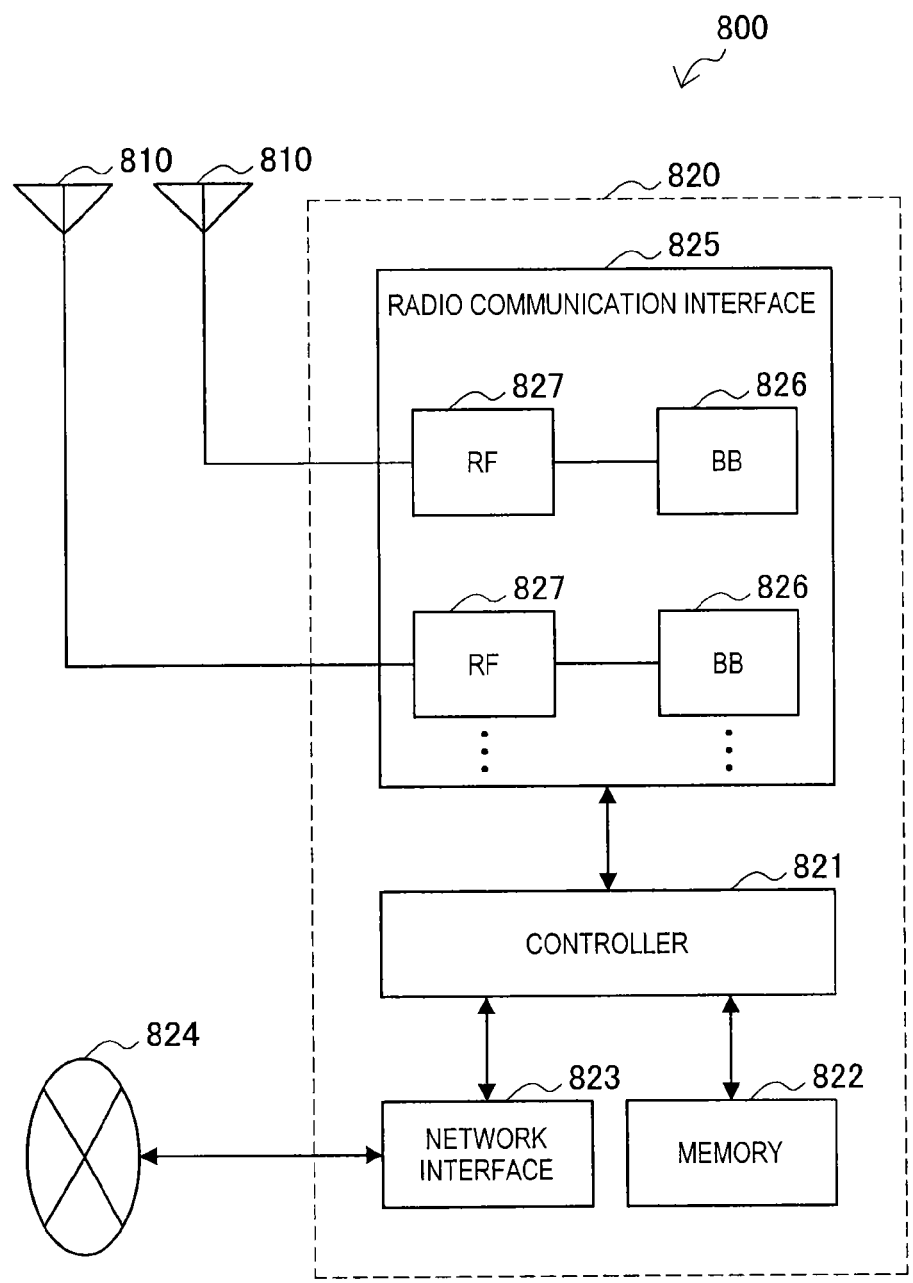
FIG. 28 is a block diagram illustrating a first example of a schematic configuration of an eNodeB to which technology according to the present disclosure may be applied.

FIG. 28 is a block diagram illustrating a first example of a schematic configuration of an eNodeB to which technology according to an embodiment of the present disclosure may be applied. An eNodeB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. In particular, in the embodiment of the present disclosure, at least one antenna 810 is a directional antenna capable of forming the beam in the 3-dimensional direction. The eNodeB 800 may include a plurality of antennas 810 as illustrated in FIG. 28, and the plurality of antennas 810 may respectively correspond to a plurality of frequency bands used by the eNodeB 800, for example. Note that although FIG. 28 illustrates an example of the eNodeB 800 including a plurality of antennas 810, the eNodeB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNodeB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNodeB via the network interface 823. In this case, the eNodeB 800 and the core network node or other eNodeB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNodeB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as illustrated in FIG. 28, and the plurality of BB processors 826 may respectively correspond to a plurality of frequency bands used by the eNodeB 800, for example. In addition, the radio communication interface 825 may also include a plurality of RF circuits 827 as illustrated in FIG. 28, and the plurality of RF circuits 827 may respectively correspond to a plurality of antenna elements, for example. Note that although FIG. 28 illustrates an example of the radio communication interface 825 including a plurality of BB processors 826 and a plurality of RF circuits 827, the radio communication interface 825 may also include a single BB processor 826 or a single RF circuit 827.

(Second Application)

Figure 29:
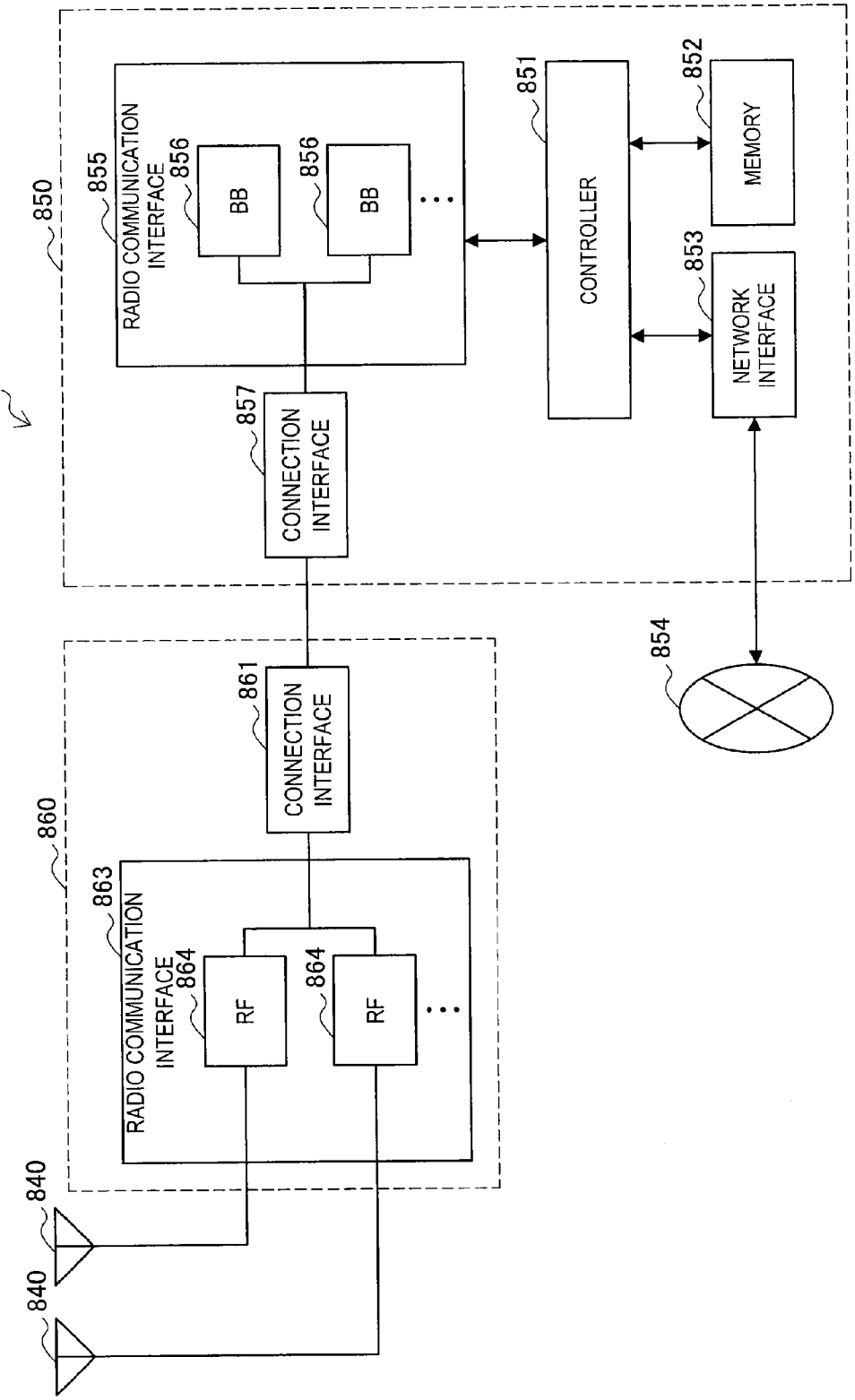
FIG. 29 is a block diagram illustrating a second example of a schematic configuration of an eNodeB to which technology according to the present disclosure may be applied.

FIG. 29 is a block diagram illustrating a second example of a schematic configuration of an eNodeB to which technology according to an embodiment of the present disclosure may be applied. An eNodeB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. In particular, in the embodiment of the present disclosure, at least one antenna 840 is a directional antenna capable of forming the beam in the 3-dimensional direction. The eNodeB 830 may include a plurality of antennas 840 as illustrated in FIG. 29, and the plurality of antennas 840 may respectively correspond to a plurality of frequency bands used by the eNodeB 830, for example. Note that although FIG. 29 illustrates an example of the eNodeB 830 including a plurality of antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 28.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 28, except for being connected to an RF circuit 864 of the RRH 860 via the connection interface 857. The radio communication interface 855 may also include a plurality of BB processors 856 as illustrated in FIG. 29, and the plurality of BB processors 856 may respectively correspond to a plurality of frequency bands used by the eNodeB 830, for example. Note that although FIG. 29 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as illustrated in FIG. 29, and the plurality of RF circuits 864 may respectively correspond to a plurality of antenna elements, for example. Note that although FIG. 29 illustrates an example of the radio communication interface 863 including a plurality of RF circuits 864, the radio communication interface 863 may also include a single RF circuit 864.

In the eNodeB 800 and the eNodeB 830 illustrated in FIGS. 28 and 29, the control unit 150 described with reference to FIG. 13 may be implemented in the radio communication interface 825 as well as the radio communication interface 855 and/or the radio communication interface 863. Also, at least some of these functions may also be implemented in the controller 821 and the controller 851.

10.2. Applications Related to UE (First Application)

Figure 30:
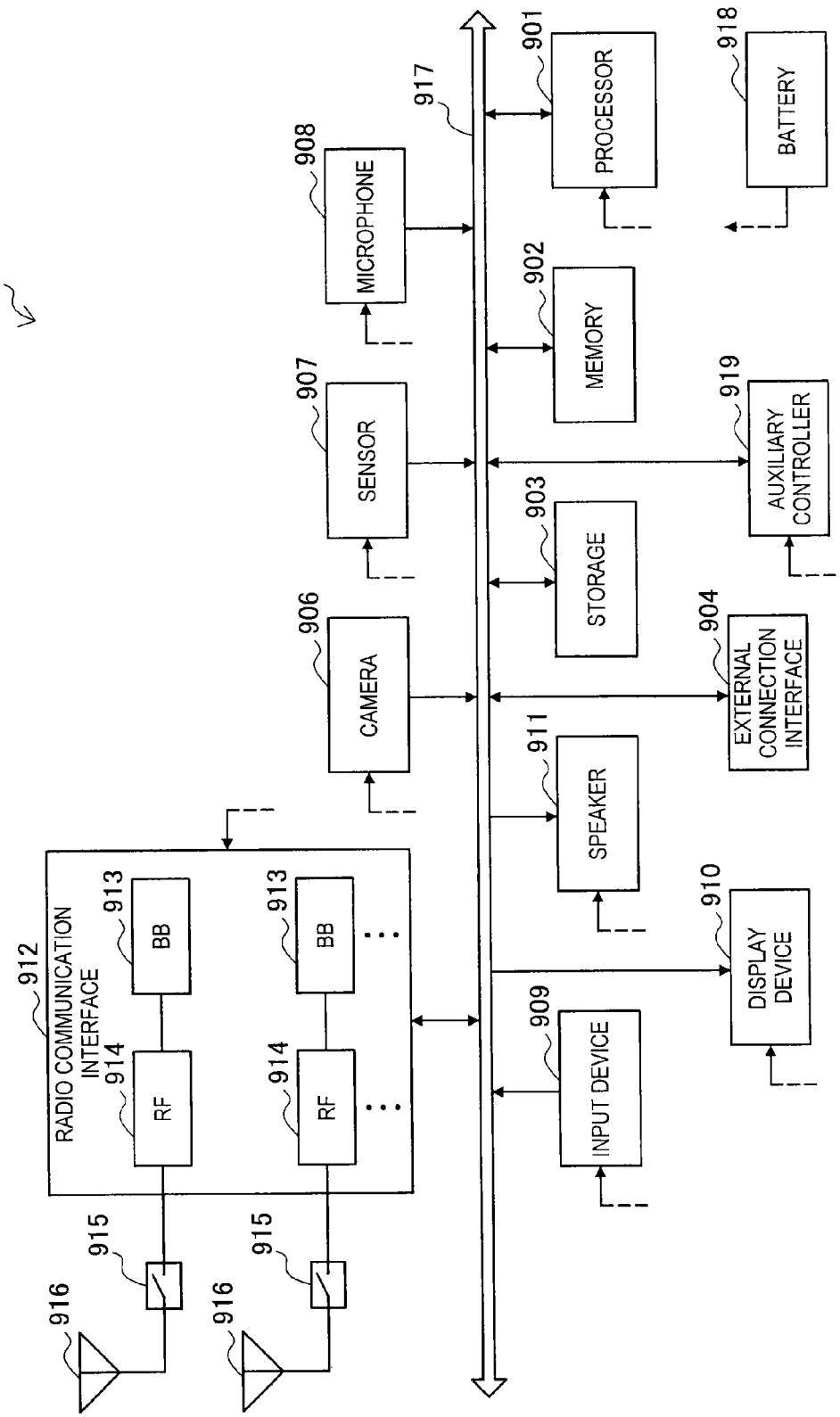
FIG. 30 is a block diagram illustrating an example of a schematic configuration of a smartphone to which technology according of the present disclosure may be applied.

FIG. 30 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 30. Note that although FIG. 30 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as illustrated in FIG. 30. Note that although FIG. 30 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 30 via power supply lines partially illustrated with dashed lines in the drawing. The auxiliary controller 919 causes minimal functions of the smartphone 900 to operate while in a sleep mode, for example.

In the smartphone 900 illustrated in FIG. 30, the control unit 240 described with reference to FIG. 14 may be implemented in the radio communication interface 912. Also, at least some of these functions may also be implemented in the processor 901 or the auxiliary controller 919.

(Second Application)

FIG. 31 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as illustrated in FIG. 31. Note that although FIG. 31 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as illustrated in FIG. 31. Note that although FIG. 31 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 31 via power supply lines partially illustrated with dashed lines in the drawing. Also, the battery 938 stores electric power supplied from the vehicle.

In the car navigation device 920 illustrated in FIG. 31, the control unit 240 described with reference to FIG. 14 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

11. CONCLUSION

The communication device and each process according to the embodiment of the present disclosure have been described above with reference to FIGS. 1 to 27. According to the embodiment of the present disclosure, when the plurality of beams are formed in the different 3-dimensional directions by the directional antenna capable of forming the beams in the 3-dimensional directions, each of the plurality of communication regions corresponding to the individual beams formed by the directional antenna is regarded as the virtual cell (that is, the virtual cell) and the communication control is performed. More specifically, for example, the communication control is performed such that the control signal is generated for each of the individual communication regions (that is, the virtual cells) of the plurality of communication regions and the control signal is transmitted to the corresponding individual communication region.

According to the scheme, it is possible to further increase the amount of transmittable control signal.

In the above-described scheme, like MU-MIMO, the pairing of UE may not be performed. This is because a process such as pairing is not necessary in the scheme related to the virtual cell since communication of the users (that is, the UEs) located in different cells is merely spatially multiplexed (that is, the UEs located in the different cells simultaneously use the same frequency). Therefore, the burden of the pairing is reduced compared to MU-MIMO.

In addition, when the virtual cell is used, interference between cells rarely occurs at the cell edge.

For example, the virtual cell is a virtual small cell partially or entirely overlapped by the macro cell.

For the pico cell of the virtual cell, the reception power is nearly uniform across the entire pico cell. Therefore, the ABS itself is not necessary and the scheduling related to the ABS is not necessary either. Therefore, the burden of the scheduling by the pico eNodeB is reduced.

When the ABS is used, the throughput of the macro cell generally deteriorates. However, as described above, when the pico cell which is a virtual cell is used, the ABS itself is not necessary. Accordingly, by using the pico cell which is the virtual cell, it is possible to prevent the throughput of the macro cell from deteriorating.

For example, the control signal includes a control signal used to transmit information regarding radio resource assignment. More specifically, the control signal includes, for example, a control signal transmitted with the physical downlink control channel (PDCCH).

Thus, the control signal for assigning the radio resources can be separately transmitted for each virtual cell. Therefore, the number of control signals for assigning the radio resources which can be transmitted from one eNodeB can be set to be greater than when MU-MIMO is used. That is, an amount of information for assigning the radio resources such as the downlink assignment and the uplink grant can be set to be greater. As a result, since the constraint on a transmission amount of the control signal decreases, more user data can be transmitted. That is, the throughput in the radio communication system 1 can be improved. Thus, when the virtual cell is used, a greater cell-splitting gain can be obtained.

For example, the control signal includes a control signal used to transmit identification information of the cell. More specifically, for example, the control signal includes a control signal transmitted with a synchronization channel.

Thus, the UE can recognize each virtual cell as one cell in cell search. Accordingly, the UE can be caused to regard the virtual cell as one cell and perform the communication.

For example, the control signal includes a common reference signal (CRS).

Thus, the UE 200 can demodulate the received signal using the CRS. That is, the UE 200 can demodulate another received signal based on the phase of the CRS. Therefore, not only a reception scheme of demodulating a received signal using a channel state information reference signal (CSI-RS) but also a reception scheme of demodulating a received signal using the CRS can be adopted. Accordingly, the reception scheme can be selected more freely in the radio communication system 1.

According to the first modification example, the directional antenna is a directional antenna of a base station for a small cell partially or entirely overlapped by a macro cell. Each of the plurality of communication regions is partially or entirely overlapped by the macro cell. In addition, the virtual cell is a virtual small cell partially or entirely overlapped by the macro cell.

Thus, when the pico eNodeB forms the virtual cells, several advantageous effects can be obtained as follows.

For example, when it is preferable to form the pico cell in a region (for example, near a cell edge) distant from the center of the macro cell and the macro eNodeB forms a pico cell as a virtual cell, the radius of the pico cell may increase. On the other hand, when the pico eNodeB located near the region forms a virtual cell, the radius of the pico cell can be adjusted to a desired size. As a result, the pico cell with a desired size can be formed in the region.

When the pico eNodeB forms the virtual cell, the number of pico eNodeBs to be installed can be suppressed. As a result, it is possible to suppress the cost necessary for the radio communication system 1. More specifically, about 10 pico eNodeBs can be formed around the macro eNodeB. However, it is impossible to actually form, for example, about 300 pico eNodeBs. Accordingly, for example, by forming about 10 pico eNodeBs around the macro eNodeB and forming about 50 virtual cells in the pico eNodeB, about 500 pico cells which are virtual cells can be formed around the macro eNodeB. Thus, even when the small number of pico eNodeBs are installed, a desired number of pico cells can be formed.

As described above, when the pico cell which is the virtual cell is used, the reception power is nearly uniform across the entire pico cell. Therefore, the ABS itself is not necessary, and thus scheduling of the ABS is not necessary. Thus, the burden of the scheduling by the pico eNodeB is reduced. When the pico cell which is a virtual cell is used, the ABS itself is not necessary. Thus, by using the pico cell which is a virtual cell, it is possible to prevent the throughput of the macro cell from deteriorating.

For example, transmission power of the plurality of beams is decided so that the reception power of the beams corresponding to the communication regions is greater than the reception power of the signal transmitted by the macro eNodeB 11 in the individual communication regions (that is, the individual virtual pico cells) of the plurality of communication regions. For example, information regarding the reception power of a signal transmitted by the macro eNodeB 11 and the reception power in the individual communication region (that is, the individual virtual pico cell) of the plurality of communication regions is acquired. Then, the transmission power of the beam corresponding to the individual communication region is decided based on the acquired information.

As described above, by deciding the power of the beam, it is possible to reduce the influence of the interference by the transmission signal of the macro eNodeB in the virtual pico cell. As a result, the UE can perform the radio communication with the eNodeB in the virtual pico cell.

According to the second modification example of the embodiment of the present disclosure, the CRS of each of the individual communication regions (that is, the virtual cells) of the plurality of communication regions is transmitted with the corresponding beam among the plurality of beams. The common CRS to the plurality of communication regions is transmitted with the nondirectional beam formed by the directional antenna.

Accordingly, the UE can obtain the channel information indicating a channel between the eNodeB and the UE. That is, since the directional CRS is multiplied by the weighting coefficient, it is difficult to obtain the same channel information as that of the related art from the directional CRS. Since the nondirectional CRS is not multiplied by any of the weighting coefficients, the same channel information as that of the related art can be obtained from the nondirectional CRS.

Moreover, for example, the control unit supplies a terminal device located in one communication region among the plurality of communication regions with a weighting coefficient of the beam corresponding to communication region adjacent to the communication region in which the terminal device is located.

Thus, the UE can virtually calculate the reception power of the signal of the adjacent virtual cell even when the reception power of the signal of the adjacent virtual cell may not actually be measured. Accordingly, it is possible to specify the adjacent virtual cell suitable for the handover satisfactorily. Since the actual measurement of the reception power is not involved, the scheme can be performed at a higher speed. Since a target is restricted to the adjacent virtual cell, an increase in a processing amount is suppressed. This point also enables the above-described scheme to be performed at a higher speed.

For example, the control signal may not include the common reference signal and the common reference signal to the plurality of communication regions may be transmitted with the nondirectional beam formed by the directional antenna.

Thus, the UE 200 does not necessarily distinguish the directional CRS from the nondirectional CRS and can acquire the channel information from the reception result of the CRS.

In the third modification example of the embodiment, the communication region regarded as a virtual cell is added, deleted or changed by controlling the forming of the beam of the directional antenna.

Thus, since a virtual cell can be added, deleted, or changed flexibly, the radio communication system 1 can be disposed and administrated more flexibly. Since the virtual cell can be formed quickly in a region in which traffic is great, it is possible to improve the throughput of the radio communication system.

For example, the addition, deletion, or change in the communication region is performed step by step by controlling the forming of the beam of the directional antenna such that the beam formed by the directional antenna is changed step by step. Specifically, for example, the forming of the beam of the directional antenna is controlled such that the transmission power of the beam formed by the directional antenna is changed step by step. For example, the forming of the beam of the directional antenna is controlled such that the size of the communication region corresponding to the beam formed by the directional antenna is changed step by step.

Accordingly, it is possible to reduce the influence of the addition, deletion, and change in the virtual cell on the existing communication.

For example, when the virtual cell is added, a virtual cell abruptly appears, and the UE is located within or near the virtual cell, the signal of the virtual cell can interfere with the existing communication of the UE. On the other hand, when the transmission power is gradually increased or the size of the virtual cell is gradually enlarged, the UE can perform handover at the time point at which the virtual cell is a handover target. Accordingly, the influence on the existing communication of the UE 200 is small.

For example, when the virtual cell is deleted, the virtual cell abruptly disappears, and the UE is located within or near the virtual cell, an LOF of the UE can occur. On the other hand, when the transmission power is gradually decreased or the size of the virtual cell is gradually contracted, the UE 200 can perform handover to another virtual cell (or a normal cell) before the virtual cell disappears. Accordingly, the influence on the existing communication of the UE 200 is small.

For example, even when the virtual cell is changed, the influence on the existing communication of the UE 200 is small, as in the addition or deletion of the virtual cell.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

The example in which the radio communication system conforms to a series of communication standards of LTE has been described, but an embodiment of the present disclosure is not limited to related examples. For example, the radio communication system may be a system conforming to other communication standards. In this case, a base station included in the radio communication system may be realized as a different kind of base station such as a NodeB or a base transceiver station (BTS) instead of the eNodeB. The terminal device included in the radio communication system may be realized as a different kind of terminal device such as a mobile station (MS) instead of the UE.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, eNodeB) or a terminal device (for example, UE) to exhibit functions similar to each structural element of the foregoing communication control device. It becomes also possible to provide a storage medium which stores the computer program.

Additionally, the present technology may also be configured as below.

(1)
A communication control device including:
a control unit configured to regard each of a plurality of communication regions corresponding to individual beams formed by a directional antenna capable of forming the beams in 3-dimensional directions as a virtual cell and perform communication control when the plurality of beams are formed in the different 3-dimensional directions by the directional antenna.

(2)
The communication control device according to (1), wherein the control unit performs the communication control in a manner that a control signal is generated for each individual communication region of the plurality of communication regions and the control signal is transmitted to the corresponding individual communication region.

(3)
The communication control device according to (2), wherein the control signal includes a control signal used to transmit control information regarding assignment of radio resources.

(4)
The communication control device according to (3), wherein the control signal includes a control signal transmitted with a physical downlink control channel.

(5)
The communication control device according to any one of (2) to (4), wherein the control signal includes a control signal used to transmit identification information regarding a cell.

(6)
The communication control device according to (5), wherein the control signal includes a control signal transmitted with a synchronization channel.

(7)
The communication control device according to any one of (2) to (6), wherein the control signal includes a common reference signal.

(8)
The communication control device according to any one of (1) to (7),
wherein the directional antenna is a directional antenna of a base station for a small cell partially or entirely overlapped by a macro cell,
wherein each of the plurality of communication regions is partially or entirely overlapped by the macro cell, and
wherein the virtual cell is a virtual small cell partially or entirely overlapped by the macro cell.

(9)
The communication control device according to (8), wherein the control unit decides transmission power of the plurality of beams in a manner that, in the individual communication region of the plurality of communication regions, reception power of the beam corresponding to the communication region is greater than reception power of a signal transmitted by a base station of the macro cell.

(10)
The communication control device according to (9), wherein the control unit acquires information regarding reception power which is the reception power of the signal transmitted by the base station of the macro cell and is the reception power in the individual communication region of the plurality of communication regions, and decides transmission power of the beam corresponding to the individual communication region based on the information.

(11)
The communication control device according to (7),
wherein the common reference signal of each individual communication region of the plurality of communication regions is transmitted with the corresponding beam among the plurality of beams, and
wherein the common reference signal to the plurality of communication regions is transmitted with a nondirectional beam formed by the directional antenna.

(12)
The communication control device according to (11), wherein the control unit supplies a terminal device located in one communication region among the plurality of communication regions with a weighting coefficient of the beam corresponding to communication region adjacent to the communication region in which the terminal device is located.

(13)
The communication control device according to any one of (2) to (6),
wherein the control signal does not include a common reference signal, and
wherein the common reference signal to the plurality of communication regions is transmitted with a nondirectional beam formed by the directional antenna.

(14)
The communication control device according to any one of (1) to (13), wherein the control unit adds, deletes, or changes the communication region regarded as the virtual cell by controlling the forming of the beam by the directional antenna.

(15)
The communication control device according to (14), wherein the control unit adds, deletes, or changes the communication region step by step by controlling the forming of the beam by the directional antenna in a manner that the beam formed by the directional antenna is changed step by step.

(16)
The communication control device according to (15), wherein the control unit controls the forming of the beam by the directional antenna in a manner that transmission power of the beam formed by the directional antenna is changed step by step.

(17)
The communication control device according to (15) or (16), wherein the control unit controls the forming of the beam by the directional antenna in a manner that a size of a communication region corresponding to the beam formed by the directional antenna is changed step by step.

(18)

The communication control according to any one of (1) to (17), wherein the virtual cell is a virtual small cell partially or entirely overlapped by a macro cell.

(19)

A communication control method including:

regarding each of a plurality of communication regions corresponding to individual beams formed by a directional antenna capable of forming the beams in 3-dimensional directions as a virtual cell and performing communication control when the plurality of beams are formed in the different 3-dimensional directions by the directional antenna.

(20)

A terminal device including:

a radio communication unit configured to perform radio communication with a base station that regards each of a plurality of communication regions corresponding to individual beams formed by a directional antenna capable of forming the beams in 3-dimensional directions as a virtual cell and performs communication control when the plurality of beams are formed in the different 3-dimensional directions by the directional antenna; and a control unit configured to regard each of the plurality of communication regions as the virtual cell and perform a communication process.

REFERENCE SIGNS LIST 1 radio communication system
40 directional antenna
50 beam
60 virtual cell, virtual pico cell
100 eNodeB
110 antenna unit
120 radio communication unit
130 network communication unit
140, 141 storage unit
150, 151 control unit
200 user equipment (UE)
210 antenna unit
220 radio communication unit
230, 231 storage unit
240, 241 control unit

The invention claimed is:

1. A communication control device comprising:
circuitry configured to
control each of a plurality of communication regions corresponding to individual beams formed by a directional antenna that forms the beams in 3-dimensional directions as a virtual cell; and
perform communication control via a plurality of different control signals, each of the plurality of control signals corresponding to one of the plurality of communication regions, when the plurality of beams are formed in the different 3-dimensional directions by the directional antenna,
wherein the plurality of different control signals include a plurality of different physical downlink control channels (PDCCHs) and a plurality of physical downlink shared channels (PDSCHs).

2. The communication control device according to claim 1, wherein the circuitry transmits each of the plurality of different control signals to respective ones of the plurality of communication regions.

3. The communication control device according to claim 2, wherein the plurality of control signals include control signals used to transmit control information regarding assignment of radio resources.

4. The communication control device according to claim 2, wherein the plurality of control signals include control signals used to transmit identification information regarding a cell.

5. The communication control device according to claim 4, wherein the plurality of control signals include control signals transmitted with a synchronization channel.

6. The communication control device according to claim 2, wherein the plurality of control signals include a common reference signal.

7. The communication control device according to claim 1,
wherein the directional antenna is a directional antenna of a base station for a small cell partially or entirely overlapped by a macro cell, the small cell having less coverage than the macro cell,
wherein each of the plurality of communication regions is partially or entirely overlapped by the macro cell, and
wherein the virtual cell is a virtual small cell partially or entirely overlapped by the macro cell.

8. The communication control device according to claim 7, wherein the circuitry decides transmission power of the plurality of beams in a manner that, in the individual communication region of the plurality of communication regions, reception power of the beam corresponding to the communication region is greater than reception power of a signal transmitted by a base station of the macro cell.

9. The communication control device according to claim 8, wherein the circuitry acquires information regarding reception power which is the reception power of the signal transmitted by the base station of the macro cell and is the reception power in the individual communication region of the plurality of communication regions, and decides transmission power of the beam corresponding to the individual communication region based on the information.

10. The communication control device according to claim 6,
wherein the common reference signal of each individual communication region of the plurality of communication regions is transmitted with the corresponding beam among the plurality of beams, and
wherein the common reference signal to the plurality of communication regions is transmitted with a nondirectional beam formed by the directional antenna.

11. The communication control device according to claim 10, wherein the circuitry supplies a terminal device located in one communication region among the plurality of communication regions with a weighting coefficient of the beam corresponding to communication region adjacent to the communication region in which the terminal device is located.

12. The communication control device according to claim 2,
wherein the plurality of control signals do not include a common reference signal, and
wherein the common reference signal to the plurality of communication regions is transmitted with a nondirectional beam formed by the directional antenna.

13. The communication control device according to claim 1, wherein the circuitry adds, deletes, or changes the communication region regarded as the virtual cell by controlling the forming of the beam by the directional antenna.

14. The communication control device according to claim 13, wherein the circuitry adds, deletes, or changes the communication region step by step by controlling the forming of the beam by the directional antenna in a manner that the beam formed by the directional antenna is changed step by step.

15. The communication control device according to claim 14, wherein the circuitry controls the forming of the beam by the directional antenna in a manner that transmission power of the beam formed by the directional antenna is changed step by step.

16. The communication control device according to claim 14, wherein the circuitry controls the forming of the beam by the directional antenna in a manner that a size of a communication region corresponding to the beam formed by the directional antenna is changed step by step.

17. The communication control according to claim 1, wherein the virtual cell is a virtual small cell partially or entirely overlapped by a macro cell.

18. A communication control method comprising:
controlling, with circuitry, each of a plurality of communication regions corresponding to individual beams formed by a directional antenna capable of forming the beams in 3-dimensional directions as a virtual cell; and
performing, with the circuitry, communication control via a plurality of different control signals, each of the plurality of control signals corresponding to one of the plurality of communication regions, when the plurality of beams are formed in the different 3-dimensional directions by the directional antenna,
wherein the plurality of different control signals include a plurality of different physical downlink control channels (PDCCHs) and a plurality of physical downlink shared channels (PDSCHs).

19. A terminal device comprising:
circuitry configured to
perform radio communication with a base station that controls each of a plurality of communication regions corresponding to individual beams formed by a directional antenna that forms the beams in 3-dimensional directions as a virtual cell and performs communication control via a plurality of different control signals, each of the plurality of control signals corresponding to one of the plurality of communication regions, when the plurality of beams are formed in the different 3-dimensional directions by the directional antenna; and
regard each of the plurality of communication regions as the virtual cell and perform a communication process,
wherein the plurality of different control signals include a plurality of different physical downlink control channels (PDCCHs) and a plurality of physical downlink shared channels (PDSCHs).

* * * * *